(12) United States Patent
Hill

(10) Patent No.: US 7,161,680 B2
(45) Date of Patent: Jan. 9, 2007

(54) APPARATUS AND METHOD FOR JOINT AND TIME DELAYED MEASUREMENTS OF COMPONENTS OF CONJUGATED QUADRATURES OF FIELDS OF REFLECTED/SCATTERED AND TRANSMITTED/SCATTERED BEAMS BY AN OBJECT IN INTERFEROMETRY

(75) Inventor: Henry Allen Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 0 days.

(21) Appl. No.: 11/204,758

(22) Filed: Aug. 16, 2005

(65) Prior Publication Data

US 2006/0033924 A1 Feb. 16, 2006

Related U.S. Application Data

(60) Provisional application No. 60/602,046, filed on Aug. 16, 2004.

(51) Int. Cl.
*G01B 11/02* (2006.01)

(52) U.S. Cl. .................................... 356/511

(58) Field of Classification Search ............... 356/450, 356/489, 495, 511–515
See application file for complete search history.

(56) References Cited

U.S. PATENT DOCUMENTS

| | | |
|---|---|---|
| 3,628,027 A | 12/1971 | Brauss |
| 3,748,015 A | 7/1973 | Offner |
| 4,011,011 A | 3/1977 | Hemstreet et al. |
| 4,226,501 A | 10/1980 | Shafer |
| 4,272,684 A | 6/1981 | Seachman |
| 4,408,884 A | 10/1983 | Kleinknecht et al. |
| 4,672,196 A | 6/1987 | Canino |
| 4,685,803 A | 8/1987 | Sommargren |
| 4,733,967 A | 3/1988 | Sommargren |
| 5,220,403 A | 6/1993 | Batchelder et al. |
| 5,241,423 A | 8/1993 | Chiu et al. |
| 5,327,223 A | 7/1994 | Korth |
| 5,384,639 A | 1/1995 | Wickramasinghe |

(Continued)

OTHER PUBLICATIONS

U.S. Appl. No. 60/442,858, filed Jan. 27, 2003, Hill.

(Continued)

*Primary Examiner*—Hwa (Andrew) Lee
*Assistant Examiner*—Patrick J. Connolly
(74) *Attorney, Agent, or Firm*—Wilmer Cutler Pickering Hale and Dorr LLP

(57) ABSTRACT

A method of interferometrically obtaining measurements for properties associated with a spot on or in an object, the method involving: receiving a sequence of M optical pulses separated in time; from each pulse in the sequence of M optical pulses, generating an n-tuplet of measurement pulses, and an n-tuplet of reference pulses, wherein each measurement pulse has a corresponding reference pulse aligned with it in time; from each pulse of each n-tuplet of reference pulses for the sequence of M optical pulses, generating a reference beam; from each pulse of each n-tuplet of measurement pulses for the sequence of M optical pulses, (a) generating a measurement beam; (b) directing the measurement beam onto the spot to thereby produce a return measurement beam from the spot; and (c) combining the return measurement beam with the corresponding reference beam that was derived from the reference pulse corresponding to that measurement pulse to generate an interference beam, wherein the sequence of M n-tuplets of measurement pulses forms n interleaved sequences of M measurement pulses, and wherein the method further involves, for each of the n interleaved sequences of M measurement pulses, introducing a combination of phase shifts between the measurement beams and corresponding reference beams.

25 Claims, 16 Drawing Sheets

U.S. PATENT DOCUMENTS

| | | | |
|---|---|---|---|
| 5,392,118 | A | 2/1995 | Wickramasinghe |
| 5,485,317 | A | 1/1996 | Perissinotto |
| 5,602,643 | A | 2/1997 | Barrett |
| 5,614,763 | A | 3/1997 | Womack |
| 5,633,972 | A | 5/1997 | Walt |
| 5,659,420 | A | 8/1997 | Wakai |
| 5,699,201 | A | 12/1997 | Lee |
| 5,757,493 | A | 5/1998 | Vaknerkhove |
| 5,760,901 | A | 6/1998 | Hill |
| 5,828,455 | A | 10/1998 | Smith |
| 5,894,195 | A | 4/1999 | McDermott |
| 5,915,048 | A | 6/1999 | Hill et al. |
| 5,923,423 | A | 7/1999 | Sawatari et al. |
| 6,011,654 | A | 1/2000 | Schweizer et al. |
| 6,018,391 | A | 1/2000 | Yosida |
| 6,052,231 | A | 4/2000 | Rosenbluth |
| 6,091,496 | A | 7/2000 | Hill |
| 6,108,087 | A * | 8/2000 | Nikoonahad et al. ....... 356/511 |
| 6,124,931 | A | 9/2000 | Hill |
| 6,252,222 | B1 * | 6/2001 | Kasapi et al. ........... 250/214 R |
| 6,271,923 | B1 | 8/2001 | Hill |
| 6,330,065 | B1 | 12/2001 | Hill |
| 6,445,453 | B1 | 9/2002 | Hill |
| 6,447,122 | B1 | 9/2002 | Kobayashi et al. |
| 6,469,788 | B1 | 10/2002 | Boyd et al. |
| 6,480,285 | B1 | 11/2002 | Hill |
| 6,552,805 | B1 | 4/2003 | Hill |
| 6,552,852 | B1 | 4/2003 | Hill |
| 6,597,721 | B1 | 7/2003 | Hutchinson et al. |
| 6,606,159 | B1 | 8/2003 | Hill |
| 6,667,809 | B1 | 12/2003 | Hill |
| 6,707,561 | B1 | 3/2004 | Budach et al. |
| 6,714,349 | B1 | 3/2004 | Nam |
| 6,717,736 | B1 | 4/2004 | Hill |
| 6,753,968 | B1 | 6/2004 | Hill |
| 6,771,374 | B1 | 8/2004 | Rangarajan et al. |
| 6,775,009 | B1 | 8/2004 | Hill |
| 6,806,959 | B1 | 10/2004 | Tukker |
| 6,847,029 | B1 | 1/2005 | Hill |
| 6,847,452 | B1 | 1/2005 | Hill |
| 2002/0074493 | A1 | 6/2002 | Hill |
| 2002/0131179 | A1 | 9/2002 | Hill |
| 2003/0174992 | A1 | 9/2003 | Levene |
| 2004/0201852 | A1 | 10/2004 | Hill |
| 2004/0201853 | A1 | 10/2004 | Hill |
| 2004/0201854 | A1 | 10/2004 | Hill |
| 2004/0201855 | A1 | 10/2004 | Hill |
| 2004/0202426 | A1 | 10/2004 | Hill |
| 2004/0227950 | A1 | 11/2004 | Hill |
| 2004/0227951 | A1 | 11/2004 | Hill |
| 2004/0228008 | A1 | 11/2004 | Hill |
| 2004/0246486 | A1 | 12/2004 | Hill |
| 2004/0257577 | A1 | 12/2004 | Hill |
| 2005/0036149 | A1 | 2/2005 | Hill |
| 2005/0111006 | A1 | 5/2005 | Hill |
| 2005/0111007 | A1 | 5/2005 | Hill |

OTHER PUBLICATIONS

U.S. Appl. No. 60/442,982, filed Jan. 29, 2003, Hill.
U.S. Appl. No. 60/443,980, filed Jan. 31, 2003, Hill.
U.S. Appl. No. 60/444,707, filed Feb. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/448,250, filed Feb. 19, 2003, Hill.
U.S. Appl. No. 60/448,360, filed Feb. 19, 2003, Hill.
U.S. Appl. No. 60/459,425, filed Apr. 11, 2003, Hill.
U.S. Appl. No. 60/459,493, filed Apr. 1, 2003, Hill.
U.S. Appl. No. 60/460,129, filed Apr. 3, 2003, Hill.
U.S. Appl. No. 60/485,255, filed Jul. 7, 2003, Hill.
U.S. Appl. No. 60/485,507, filed Jul. 7, 2003, Hill.
U.S. Appl. No. 60/501,666, filed Sep. 10, 2003, Hill.
U.S. Appl. No. 60/506,715, filed Sep. 26, 2003, Hill.
U.S. Appl. No. 60/507,675, filed Oct. 1, 2003, Hill.
U.S. Appl. No. 60/568,774, filed May 6, 2004, Hill.
U.S. Appl. No. 60/569,807, filed May 11, 2004, Hill.
U.S. Appl. No. 60/571,967, filed May 18, 2004, Hill.
U.S. Appl. No. 60/573,196, filed May 21, 2004, Hill.

* cited by examiner

APPARATUS AND METHOD FOR JOINT AND TIME DELAYED MEASUREMENTS OF COMPONENTS OF CONJUGATED QUADRATURES OF FIELDS OF REFLECTED/SCATTERED AND TRANSMITTED/SCATTERED BEAMS BY AN OBJECT IN INTERFEROMETRY

This application claims the benefit of U.S. Provisional Application No. 60/602,046 filed Aug. 16, 2004.

TECHNICAL FIELD

This invention relates to interferometry and interferometric measurements of properties of an object.

BACKGROUND OF THE INVENTION

Related Disclosures

The following applications are related to the present application: U.S. Pat. No. 6,552,852, issued Apr. 22, 2003, entitled "Catoptric and Catadioptric Imaging Systems" (ZI-38); U.S. Ser. No. 60/447,254, filed Feb. 13, 2003, and U.S. Ser. No. 10/778,371, filed Feb. 13, 2004, both of which are entitled "Transverse Differential Interferometric Confocal Microscopy," (ZI-40); U.S. Ser. No. 60/448,360, filed Feb. 19, 2003, and U.S. Ser. No. 10/782,057, filed Feb. 19, 2004, both of which are entitled "Longitudinal Differential Interferometric Confocal Microscopy For Surface Profiling," (ZI-41); U.S. Ser. No. 60/448,250, filed Feb. 19, 2003, and U.S. Ser. No. 10/782,058, filed Feb. 19, 2004, both of which are entitled "Method And Apparatus For Dark Field Interferometric Confocal Microscopy," (ZI-42); U.S. Pat. No. 6,717,736, issued Apr. 6, 2004, entitled "Catoptric and Catadioptric Imaging Systems," (ZI-43); U.S. Ser. No. 60/442,982, filed Jan. 28, 2003, and U.S. Ser. No. 10/765,229, filed Jan. 27, 2004, both of which are entitled "Interferometric Confocal Microscopy Incorporating Pinhole Array Beam-Splitter," (ZI-45); U.S. Ser. No. 60/442,858, filed Jan. 27, 2003, and U.S. Ser. No. 10/765,369, filed Jan. 27, 2004, both of which are entitled "Apparatus And Method For Joint Measurements Of Conjugated Quadratures Of Fields Of Reflected/Scattered Beams By An Object In Interferometry," (ZI-47); U.S. Ser. No. 60/459,493, filed Apr. 1, 2003, and U.S. Ser. No. 10/218,201, filed Apr. 1, 2004, both of which are entitled "Method For Manufacture Of Catadioptric Lens System" (ZI-48); U.S. Ser. No. 60/459,425, filed Apr. 1, 2003, entitled "Apparatus And Method For Joint Measurement Of Fields Of Scattered/Reflected Orthogonally Polarized Beams By An Object In Interferometry," and U.S. Ser. No. 10/816,180, filed Apr. 1, 2004, entitled "Apparatus And Method For Joint Measurement Of Fields Of Scattered/Reflected Or Transmitted Orthogonally Polarized Beams By An Object In Interferometry," (ZI-50); U.S. Ser. No. 60/485,507, filed Jul. 7, 2003, and U.S. Ser. No. (T.B.D.), filed Jul. 7, 2004, both of which are entitled "Apparatus And Method For High Speed Scan For Sub-Wavelength Defects And Artifacts In Semiconductor Metrology," (ZI-52); U.S. Ser. No. 60/485,255, filed Jul. 7, 2003, entitled "Apparatus and Method for Ellipsometric Measurements With High Spatial Resolution," (ZI-53); U.S. Ser. No. 60/501,666, filed Sep. 10, 2003, entitled "Catoptric And Catadioptric Imaging Systems With Adaptive Catoptric Surfaces," (ZI-54); U.S. Ser. No. 60/507,675, filed Oct. 1, 2003, entitled "Method and Apparatus for Enhanced Resolution of High Spatial Frequency Components of Images Using Standing Wave Beams in Non-Interferometric and Interferometric Microscopy," (ZI-55); U.S. Ser. No. 60/506,715, filed Sep. 26, 2003, entitled "Catoptric And Catadioptric Imaging Systems Comprising Pellicle Beam-Splitters And Non-Adaptive And Adaptive Catoptric Surfaces," (ZI-56); and U.S. Ser. No. 60/571,967, filed May 18, 2004, entitled "Apparatus And Methods For Measurement Of Critical Dimensions Of Features And Detection Of Defects In UV, VUV, and EUV Lithography Masks," (ZI-63), all of which are incorporated herein by reference.

Other references, which may or may not be part of the prior art, teach the practice of interferometric confocal far-field and near-field microscopy using heterodyne techniques and a detector having a single detector element or having a relatively small number of detector elements. Other references, which may or may not be part of the prior art, further teach the practice of interferometric confocal far-field and near-field microscopy using a step and stare method with a single-homodyne detection method for the acquisition of conjugated quadratures of fields of reflected and/or scattered beams when a detector is used that comprises a large number of detector elements. The respective conjugated quadrature of a field is $|a| \sin \phi$ when the quadrature $\chi(\phi)$ of a field is expressed as $|a| \cos \phi$.

The step and stare method and single-homodyne detection method have been used in order to obtain for each detector element a set of at least four electrical interference signal values with a substrate that is being imaged and that is stationary with respect to the respective interferometric microscope during the stare portion of the step and stare method. The set of at least four electrical interference signal values are required to obtain for each detector element conjugated quadratures of fields of a measurement beam comprising a reflected and/or scattered far-field or near-field from a spot in or on a substrate that is conjugate to the each detector element.

However, the prior art does not teach the practice of acquisition of the respective at least four electrical interference signal values in interferometric far-field, evanescent-field, and near-field confocal and non-confocal microscopy when operating in a relatively fast scanning mode wherein each electrical interference signal value of the at least four electrical interference signal values corresponds to the same or substantially the same respective spot on or in a substrate and contains information that can be used for determination of joint or substantially joint and non-joint measurements of components of conjugated quadratures of fields reflected/scattered or transmitted/scattered by the respective spot in both spatial and temporal coordinates.

Other references, which may or may not be part of the prior art, also teach the practice of heterodyne and single-homodyne detection methods to obtain phase information in linear and angular displacement interferometers. However, the prior art does not teach the practice of homodyne interferometry wherein joint or substantially joint measurements in both spatial and temporal coordinates are made of conjugated quadratures of fields of beams reflected from a measurement object in single- or multiple-frequency linear and angular displacement interferometers.

Commonly owned U.S. Provisional Patent Applications and Patent Applications teach the practice of scanning interferometric far-field, evanescent-field, and near-field confocal and non-confocal microscopy using either a bi-homodyne or a quad-homodyne detection method comprising frequency encoding to obtain joint measurements of conjugated quadratures of fields either reflected and/or scattered or transmitted by a substrate with a detector having a large number of detector elements. For each spot in and/or on the substrate that is imaged a corresponding set of four or a harmonic multiple N of corresponding sets of four electrical interference signal values is obtained. Each electrical interference signal value of a corresponding set of four or harmonic multiple N of electrical interference signal values contain information for determination of a joint measurement of a respective conjugated quadratures of fields. The referenced commonly owned U.S. Provisional Patent Applications and Patent Applications comprise U.S. Provisional Patent Application No. 60/442,858 (ZI-47) and U.S. patent application Ser. No. 10/765,368 (ZI-47) wherein both are entitled "Apparatus and Method for Joint Measurements of Conjugated Quadratures of Fields of Reflected/Scattered and Transmitted Beams by an Object in Interferometry," U.S. Provisional Patent Application No. 60/459,425 (ZI-50) and U.S. patent Ser. No. 10/816,180 (ZI-50), wherein both are entitled "Apparatus and Method for Joint Measurement of Fields of Scattered/Reflected Orthogonally Polarized Beams by an Object in Interferometry," U.S. Provisional Patent Application No. 60/485,507 (ZI-52) and U.S. patent application Ser. No. 10/866,010 (ZI-52) wherein both are entitled "Apparatus and Method for High Speed Scan for Subwavelength Defects in Semiconductor Metrology," U.S. Provisional Patent Application No. 60/501,666 (ZI-54) and U.S. patent application Ser. No. 10/938,408 (ZI-54) wherein both are entitled "Catoptric and Catadioptric Imaging Systems With Adaptive Catoptric Surfaces" of which all are by Henry A. Hill and the contents of which are all incorporated herein in their entirety by reference. The cited commonly owned U.S. Provisional Patent Applications and the U.S. Patent Applications further teach the practice of linear and angular displacement interferometry comprising frequency encoding wherein joint measurements are made of conjugated quadratures of fields of beams in both spatial and temporal coordinates reflected/scattered from a measurement object.

Other references, which may or may not be part of the prior art, teach a double homodyne detection method based on use of four detectors wherein each detector generates an electrical interference signal value used to determine corresponding components of a conjugated quadratures of a field such as described in Section IV of the article by G. M D'ariano and M G. A. Paris entitled "Lower Bounds On Phase Sensitivity In Ideal And Feasible Measurements," *Phys. Rev. A* 49, pp 3022–3036 (1994). The four detectors generate the four electrical interference signal values simultaneously and each electrical interference signal value contains information relevant to a single conjugated quadratures component. Accordingly, the double homodyne detection method does not make joint or substantially joint determinations of conjugated quadratures of fields wherein each electrical interference value contains information simultaneously or substantially simultaneously about each of two orthogonal components of the conjugated quadratures.

SUMMARY OF THE INVENTION

Apparatus and methods are described for joint or substantially joint and time delayed measurements of components of conjugated quadratures of fields of reflected/scattered beams or of fields of transmitted/scattered beams in interferometry such as scanning interferometric far-field, evanescent-field, and near-field confocal and non-confocal microscopy and in interferometric based metrology such as linear displacement interferometers. Homodyne detection methods comprising a temporal encoding technique are used to obtain measurements of quantities subsequently used in determination of joint or substantially joint and non-joint time delayed measurements of components of the conjugated quadratures of the fields. The temporal encoding technique is used to encode the input beam to an interferometer and may be described in terms of a permutation operating in a temporal domain rather than for example in a frequency domain or spatial domain. The homodyne detection methods may also comprise an input beam that is encoded in a combination of temporal and frequency domains, of temporal and polarization domains, or of temporal, frequency, and polarization domains.

Various embodiments described herein involve the practice of scanning interferometric far-field, evanescent-field, and near-field confocal and non-confocal microscopy using homodyne detection methods comprising a temporal encoding technique to obtain joint or substantially joint and non-joint measurements of components of conjugated quadratures of fields either reflected and/or scattered or transmitted by a substrate with a detector, preferably based on a quantum detection process, having a large number of detector elements. For each spot in and/or on the substrate that is imaged N' corresponding sets of two electrical interference signal values are obtained. Each set of corresponding sets of two electrical interference signal values contains information for determination of a joint or substantially joint or non-joint measurement of respective components of conjugated quadratures of fields. The temporal encoding technique is used to encode the input beam to an interferometer and may be described in part as a permutation operator operating in the temporal domain rather than for example in a frequency domain or spatial domain. The homodyne detection methods may also comprise an input beam that is encoded in combinations of temporal and frequency domains, temporal and polarization domains, or temporal, frequency, and polarization domains.

The time delay or time delays of the non-joint measurements may be of the order of fractions of a picosecond to longer times, e.g. nanoseconds or microseconds.

Various embodiments also involve the practice of linear and angular displacement interferometry comprising temporal encoding wherein joint or substantially joint measurements are made of conjugated quadratures of fields of beams reflected from a measurement object.

Some of the homodyne detection methods described herein obtain 2 N' electrical interference signal values for each spot being imaged wherein each measured value of an electrical interference signal contains simultaneously or substantially simultaneously and time-delayed information about N' components of one or more conjugated quadratures.

The bi-homodyne detection method of the homodyne detection methods corresponds to N'=2 and uses a single detector element, preferably a quantum detector element, for each electrical interference signal value obtained and an input beam to an interferometer system that may be described formally in terms of a permutation operator operating in the temporal domain. Alternatively, the input beam may be described as comprising two interleaved sequences of 2N' or four pulses each wherein the correlation or fringe visibility at an interferometer between the two interleaved sequences of four pulses each is less than a predetermined value for a joint or substantially joint and time-delayed measurement of the components of the conjugated quadratures.

One sequence of the two interleaved sequences of four pulses each is used to generate components of electrical interference signals corresponding to a first component of conjugated quadratures of a field of a corresponding measurement beam comprising either a reflected and/or scattered or transmitted far-field, evanescent-field, or near-field from a spot in or on a measurement object that is conjugate to the detector element. The second sequence of the two interleaved sequence of four pulses each is used to generate other components of electrical interference signals corresponding to a respective second component of the conjugated quadratures of the field. Information about the first and second components of the conjugated quadratures is obtained jointly or substantially jointly as a consequence of the two sequences of two interleaved sequences of four pulses each having respective beam paths that are coextensive in space and having the same mean time.

Alternatively, a predetermined time delay can be arranged between the mean times of the two interleaved sequences such as of the order of a fraction of a picosecond or larger, e.g. a nanosecond or microsecond. Also, when there is a predetermined time delay between the mean times of the two interleaved pulse sequences, the corresponding measured first and second components may be arranged to correspond to the same component of a conjugated quadratures.

For each of the two sequences of two interleaved pulse sequences of the input beam used in the bi-homodyne detection method, reference and measurement beams are generated. In the embodiments of the present invention that use the bi-homodyne detection method, different phase shift combinations are introduced between the respective reference and measurement beam components of the two sequences for acquiring a set of four electrical interference signal values for each spot in or on the measurement object that is imaged. The phase shift combinations may be described formally by a rotation transform.

Variants of the bi-homodyne detection method of the homodyne detection methods use a single detector element, preferably based on a quantum detection process, to measure a $2N'$ electrical interference values for $N'$ different from 2 and an input beam to an interferometer system that may be described formally in terms of a permutation operator operating in the temporal domain.

At least some of the quad-homodyne detection methods described herein use two detectors, preferably based on a quantum detection process, and an input beam to an interferometer system comprising four measurement beams with coextensive optical paths and corresponding reference beams with coextensive optical paths in the interferometer system simultaneously or substantially simultaneously to obtain four electrical signal values wherein each measured value of an electrical interference signal contains simultaneously or substantially simultaneously information about two orthogonal components of a conjugated quadratures for a joint measurement or substantially joint measurement of conjugated quadratures of a field of a beam either reflected and/or scattered or transmitted by a spot on or in a substrate.

The input beam used in the quad-homodyne detection method comprises temporal encoding and frequency encoding or temporal and polarization encoding. One detector element is used to obtain two electrical interference signal values corresponding to one frequency or one polarization component and the second detector element is used to obtain two other of the four electrical interference signal values corresponding to the second frequency or second polarization component. Each of the two components detected by the two detector elements are temporally encoded.

One component of the measurement beam comprising a first of two frequencies or the first of two polarization states incident on the first detector element is used to generate electrical interference signal components corresponding to a first and second component of conjugated quadratures of a field of a corresponding measurement beam comprising either a reflected and/or scattered or transmitted/scattered far-field, evanescent-field, or near-field from a spot in or on a measurement object that is conjugate to a detector element. The second component of the measurement beam comprising a second frequency or the second polarization state incident on the second detector element is used to generate electrical interference signal components corresponding to the first and second components of the conjugated quadratures of the field. Information about the first and second components of the conjugated quadratures are accordingly obtained jointly or substantially jointly as a consequence of the two frequency or two polarization components being coextensive in space and having the same temporal window function in the interferometer system. The temporal window function when operating in a scanning mode corresponds to the window function of a respective set of two pulses of the input beam to the interferometer system.

When frequency encoding is used, the frequency difference of the two frequencies is such that the two frequencies are resolved by an analyzer into two beams incident on the two different detector elements wherein each of the two beams comprises a different frequency and the frequency difference is large compared to the frequency bandwidth of the detector.

When operating in the scanning mode and using the homodyne detection methods, conjugate sets of detector elements are defined and used. A conjugate set of detector elements comprises the pixels of the detector conjugate to the spot on or in the substrate at the times that the measurements are made of a corresponding set of the electrical interference signal values.

With respect to information content and signal-to-noise ratios, the components of conjugated quadratures of fields obtained jointly or substantially jointly or by time delayed measurements in a confocal or non-confocal microscopy system that is operating in a scanning mode and using the homodyne detection methods are substantially equivalent to the components of conjugated quadratures of fields obtained when operating the microscopy system in a step and stare mode, i.e. a non-scanning mode. The time delay of the non-joint measurements may be of the order of fractions of a picosecond to longer times, e.g. nanoseconds or microseconds.

The conjugated quadratures of fields obtained jointly or substantially jointly and non-jointly with respect to time when operating in the scanning mode and using the homodyne detection methods have reduced sensitivity to pinhole-to-pinhole variations in properties of a conjugate set of pinholes used in a confocal microscopy system and reduced sensitivity to pixel-to-pixel variation of properties within a set of conjugate pixels of a multipixel detector in a confocal and in a non-confocal microscopy system. The conjugated quadratures of fields obtained jointly or substantially jointly and non-jointly with respect to time when operating in the scanning mode and using the homodyne detection methods have reduced sensitivity to pulse to pulse variations of a pulsed input beam to an interferometer system used in generating the conjugated quadratures of fields and reduced sensitivity to vibrations and to a relative motion of a substrate being imaged during the joint or substantially joint and non-joint acquisition of the conjugated quadratures of fields. The reduced sensitivity is with respect to the corresponding sensitivity of conjugated quadratures of fields obtained when using a single-homodyne detection mode in either a scanning or non-scanning mode. In microscopy applications, components of conjugated quadratures of fields are obtained for each spot in and/or on a substrate that is imaged.

The components of conjugated quadratures of fields that are obtained jointly or substantially jointly in a linear displacement interferometer operating in a scanning mode and using one of the homodyne detection methods has a reduced phase redundancy problem and further has reduced sensitivity to vibrations as compared to the corresponding sensitivity of a linear displacement interferometer operating in a scanning mode and using a single-homodyne detection method.

In general, in one aspect, the invention features a method of interferometrically obtaining measurements for properties associated with a spot on or in an object. The method involves: receiving a sequence of M optical pulses separated in time, wherein M is an integer; from each pulse in the sequence of M optical pulses, generating an n-tuplet of measurement pulses spaced apart in time, and an n-tuplet of reference pulses that are spaced apart in time, wherein n is an integer, wherein each measurement pulse has a corresponding reference pulse aligned with it in time; from each pulse of each n-tuplet of reference pulses for the sequence of M optical pulses, generating a reference beam; from each pulse of each n-tuplet of measurement pulses for the sequence of M optical pulses, (a) generating a measurement beam; (b) directing the measurement beam onto the spot to thereby produce a return measurement beam from said spot; and (c) combining the return measurement beam with the corresponding reference beam that was derived from the reference pulse corresponding to that measurement pulse to generate an interference beam, wherein the sequence of M n-tuplets of measurement pulses forms n interleaved sequences of M measurement pulses, and wherein the method further involves, for each of the n interleaved sequences of M measurement pulses, introducing a combination of phase shifts between the measurement beams and corresponding reference beams.

Other embodiments include one or more of the following features. The spacing between the pulses of each n-tuplet is less than the spacing between the pulses of the M pulse sequence. The pulses of the sequence of M optical pulses have a spacing in time of $T_r$. Generating from each pulse in the sequence of M optical pulses the n-tuplet of measurement pulses spaced apart in time involves generating the n-tuplet of measurement pulses to have a spacing in time of $t_T$. The pulses of the n-tuplet have a half-width of $t_p$ and wherein $t_T > t_p$. Also, $T_r >> t_T$. The combination of phase shifts is selected so that each of the n interleaved sequences of M measurement pulses maps to a different component of one or more conjugated quadratures of fields of one or more beams coming from the spot on or in the object. In some embodiments, n equals 2 and M is equal to four. The two interleaved sequences of M measurement pulses includes a first sequence and a second sequence, and wherein the combinations of phase shifts are selected so that the first sequence of measurement pulses maps to a first component of conjugated quadratures of fields of beams coming from the spot and the second sequence of measurement pulses maps to a second component of the conjugated quadratures of the fields of the beams coming from the spot. Alternatively, the combinations of phase shifts are selected so that each of the n interleaved sequences of M measurement pulses maps to a different component of one or more conjugated quadratures of fields of beams coming from the spot on or in the object. The method also involves, for each n-tuplet of the M n-tuplets of measurement pulses, producing a single electrical interference signal value from the corresponding n interference beams for that n-tuplet of measurement pulses to thereby produce M electrical interference signal values for the sequence of M optical pulses. It further involves generating the sequence of M optical pulses. Also, each sequence of the two interleaved sequences of M measurement pulses has a corresponding average time for the pulses of that sequence and the average times for the two interleaved sequences are identical (or they are different).

In general, in another aspect, the invention features another method of interferometrically obtaining measurements for properties associated with a spot on or in an object. The method involves: receiving a sequence of M optical pulses separated in time, wherein M is an integer; from each pulse in the sequence of M optical pulses, generating an n-tuplet of measurement pulses spaced apart in time, and an n-tuplet of reference pulses that are spaced apart in time, wherein n is an integer, wherein each measurement pulse has a corresponding reference pulse aligned with it in time; from each pulse of each n-tuplet of reference pulses for the sequence of M optical pulses, generating a reference beam; from each pulse of each n-tuplet of measurement pulses for the sequence of M optical pulses, (a) generating a measurement beam; (b) directing the measurement beam onto the spot to thereby produce a return measurement beam from the spot; and (c) combining the return measurement beam with the corresponding reference beam that was derived from the reference pulse corresponding to that measurement pulse to generate an interference beam; for each n-tuplet of measurement pulses of the sequence of M n-tuplets of measurement pulses, producing a single electrical interference signal value from the corresponding n interference beams for that n-tuplet of measurement pulses to thereby produce M electrical interference signal values for the sequence of M optical pulses.

In general, in still another aspect, the invention features an interferometric system for obtaining measurements for properties associated with a spot on or in an object. The system includes: a source which during operation generates a sequence of M optical pulses separated in time, wherein M is an integer; a beam conditioner which during operation generates from each pulse in the sequence of M optical pulses, an n-tuplet of measurement pulses spaced apart in time, and an n-tuplet of reference pulses that are spaced apart in time, wherein n is an integer, wherein each measurement pulse has a corresponding reference pulse aligned with it in time; an interferometer which is configured to generate from each pulse of each n-tuplet of reference pulses for the sequence of M optical pulses, a reference beam, and to generate from each pulse of each n-tuplet of measurement pulses for the sequence of M optical pulses, a measurement beam, wherein said interferometer is further configured to direct the measurement beam onto the spot to thereby produce a return measurement beam from the spot; and to combine the return measurement beam with the corresponding reference beam that was derived from the reference pulse corresponding to that measurement pulse to generate an interference beam; a detector system which converts the interference beams to electrical interference signals; and a controller which is configured to produce for each n-tuplet of measurement pulses of the sequence of M n-tuplets of measurement pulses a single electrical interference signal value from the corresponding n interference beams for that n-tuplet of measurement pulses to thereby produce M electrical interference signal values for the sequence of M optical pulses In general, in still yet another aspect, the invention features another interferometric system for obtaining measurements for properties associated with a spot on or in an object. The system includes: a source which during operation generates a sequence of M optical pulses separated in time, wherein M is an integer; a beam conditioner which during operation generates from each pulse in the sequence of M optical pulses, an n-tuplet of measurement pulses spaced apart in time, and an n-tuplet of reference pulses that are spaced apart in time, wherein n is an integer, wherein each measurement pulse has a corresponding reference pulse aligned with it in time and wherein the sequence of M n-tuplets of measurement pulses forms n interleaved sequences of M measurement pulses; an interferometer which is configured to generate from each pulse of each n-tuplet of reference pulses for the sequence of M optical pulses, a reference beam, and to generate from each pulse of each n-tuplet of measurement pulses for the sequence of M optical pulses, a measurement beam, wherein said interferometer is further configured to direct the measurement beam onto the spot to thereby produce a return measurement beam from the spot; and to combine the return measurement beam with the corresponding reference beam that was derived from the reference pulse corresponding to that measurement pulse to generate an interference beam; a detector system which converts the interference beams to electrical interference signals; and a controller which is configured to introduce, for each of the n interleaved sequences of M measurement pulses, a combination of phase shifts between the measurement beams and corresponding reference beams.

An advantage of at least one embodiment of the present invention is that a one-, two- or three-dimensional image of a substrate may be obtained in interferometric confocal or non-confocal far-field, evanescent-field, and near-field microscopy when operating in a scanning mode with a relatively fast scan rate. The image comprises a one-, a two- or a three-dimensional array of either components of conjugated quadratures of reflected and/or scattered or transmitted fields or of conjugated quadratures and components of conjugated quadratures.

Another advantage of at least one embodiment of the present invention is that information used in the determination of a one- or two-dimensional image of a substrate may be obtained simultaneously or substantially simultaneously in interferometric confocal or non-confocal far-field, evanescent-field, and near-field microscopy when operating in a scanning mode with a relatively fast scan rate. The image comprises a one- or a two-dimensional array of either components of conjugated quadratures of reflected and/or scattered or transmitted fields or of conjugated quadratures and components of conjugated quadratures.

Another advantage of at least one embodiment of the present invention is that information used in the determination of conjugated quadratures of reflected and/or scattered or transmitted fields by a substrate is obtained jointly or substantially jointly, i.e. simultaneously or substantially simultaneously, or with a certain predetermined set of time delays.

Another advantage of at least one embodiment of the present invention is that the conjugated quadratures of fields that are obtained jointly or substantially jointly or with a certain predetermined set of time delays when operating in the scanning mode and using the homodyne detection methods have reduced sensitivity to effects of pinhole-to-pinhole variations in the properties of a conjugate set of pinholes used in a confocal microscopy system that are conjugate to a spot in or on the substrate being imaged at different times during the scan.

Another advantage of at least one embodiment of the present invention is that the conjugated quadratures of fields that are obtained jointly or substantially jointly or with a certain predetermined set of time delays when operating in the scanning mode and using the homodyne detection methods have reduced sensitivity to effects of pixel-to-pixel variation of properties within a set of conjugate pixels that are conjugate to a spot in or on the substrate being imaged at different times during the scan.

Another advantage of at least one embodiment of the present invention is that the conjugated quadratures of fields that are obtained jointly or substantially jointly or with a certain predetermined set of time delays when operating in the scanning mode and using the homodyne detection methods have reduced sensitivity to effects of pulse to pulse variations of a respective set of pulses or pulse sequences of an input beam to the interferometer system.

Another advantage of at least one embodiment of the present invention is an increased throughput for an interferometric far-field, evanescent-field, or near-field confocal or non-confocal microscope with respect to the number of spots in and/or on a substrate imaged per unit time.

Another advantage of at least one embodiment of the present invention is reduced systematic errors in a one-, a two- or a three-dimensional image of a substrate obtained in interferometric far-field, evanescent-field, and near-field confocal and non-confocal microscopy.

Another advantage of at least one embodiment of the present invention is reduced sensitivity to vibrations in generating one-, two- or three-dimensional images of a substrate by interferometric far-field, evanescent-field, and near-field confocal and non-confocal microscopy.

Another advantage of at least one embodiment of the present invention is reduced sensitivity to an overlay error of a spot in or on the substrate that is being imaged and a conjugate image of a conjugate pixel of a multipixel detector during the acquisition of at least 2N electrical interference values for each spot in and/or on a substrate imaged using interferometric far-field, evanescent-field, and near-field confocal and non-confocal microscopy. Overlay errors are errors in the set of at least 2N conjugate images of a respective set of conjugate detector pixels relative to the spot being imaged for the homodyne detection methods.

Another advantage of at least one embodiment of the present invention is that the common mode phase of corresponding reference and measurement beam components of an input beam to an interferometer does not affect values of measured conjugated quadratures when using the homodyne detection methods.

Another advantage of at least one embodiment of the present invention is the generation of spatially coherent reference and measurement beam components comprising single or multi-frequency components for interferometer systems wherein each frequency component comprises N-tuplets of pulses.

Another advantage of at least one embodiment of the present invention is the use of input beams in the UV, VUV, and EUV generated for example by non-linear optical techniques.

Another advantage of at least one embodiment of the present invention is that multiple one-, two- or three-dimensional images of a substrate may be obtained in interferometric confocal and non-confocal far-field, evanescent-field, and near-field microscopy when operating in a scanning mode with a relatively fast scan rate. The multiple images comprise one-, two- or three-dimensional arrays of multiple conjugated quadratures of reflected/scattered or transmitted/ scattered fields. The multiple conjugated quadratures are associated for example with different states of polarization of a measurement beam at the substrate or different points in time.

BRIEF DESCRIPTION OF THE DRAWINGS

In the following description of the different embodiments, many elements of the different embodiments perform like functions and are indicated with the same numerals in different respective figures of the embodiments.

DETAILED DESCRIPTION

High speed, high resolution imaging with high signal-to-noise ratios is required for example in the metrology and inspection of masks and wafers in microlithography. Techniques for obtaining high resolution imaging with high signal-to-noise ratios are interferometric far-field, evanescent-field, and near-field confocal and non-confocal microscopy. However, the high signal-to-noise ratios with the high resolution imaging generally limits data rates in part by the necessity to acquire conjugated quadratures of fields of a reflected/scattered beam or of a transmitted/scattered beam for each spot in and/on a substrate being imaged. The determination of N' conjugated quadratures requires the measurement of at least a harmonic multiple N' electrical interference signal values for each spot in and/or on the substrate being imaged. Acquisition of the at least 4 N' interference signal values for the each spots places tight restrictions on how large a rate of scan can be employed in generation of a multi-dimensional image of the substrate wherein the multi-dimensional image may comprise one or more spatial dimensions in combination with other dimensions further comprising for example polarization states of measurement beams. Embodiments of the present invention relax with the use of homodyne detection methods and variants thereof the tight restriction and permits significantly increased throughput in high resolution imaging that has high signal-to-noise ratios for each spot being imaged.

Figure 1A:
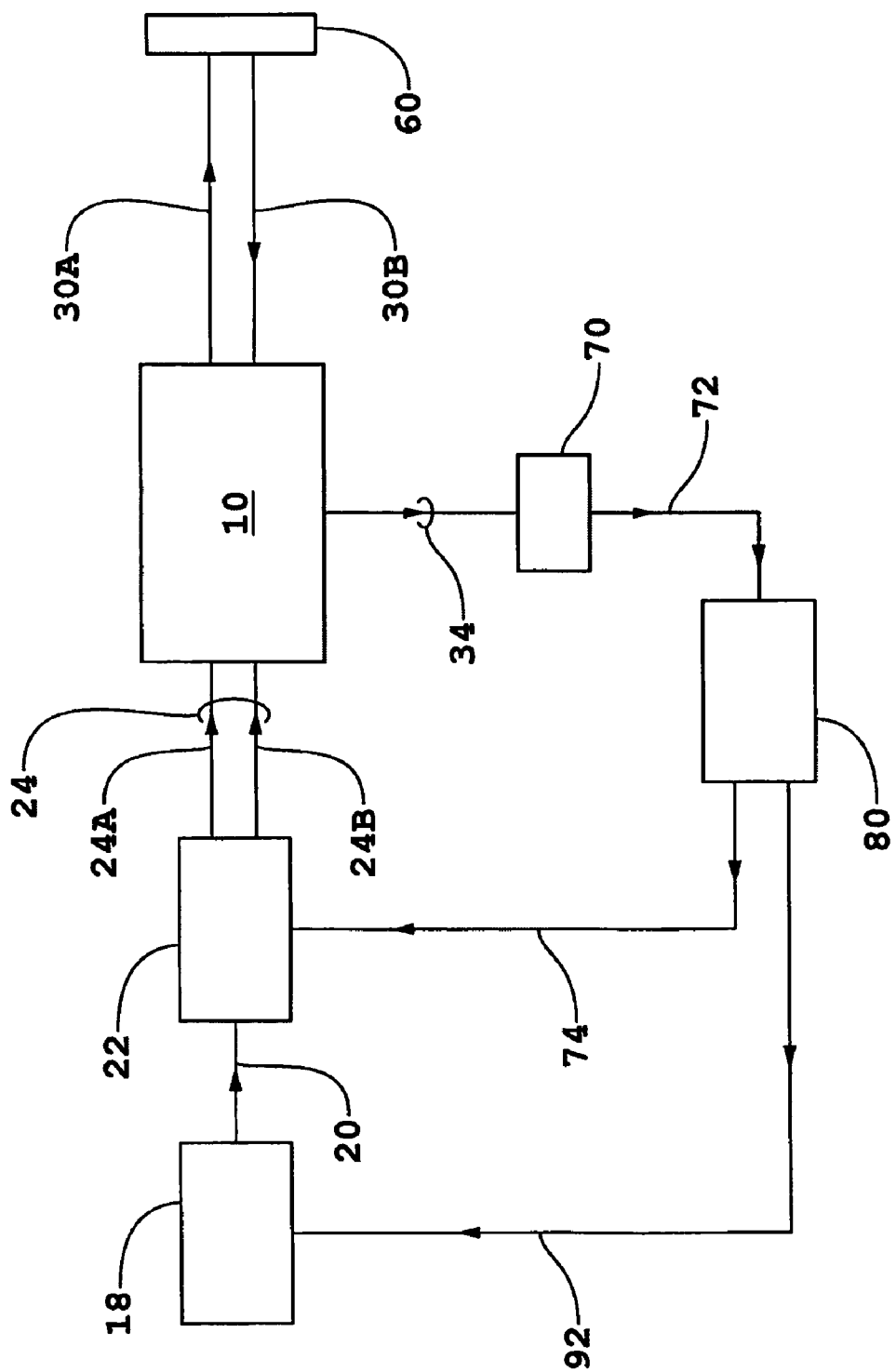
FIG. 1a is a schematic diagram of an interferometric system.

A general description of embodiments incorporating the present invention will first be given for interferometer systems wherein homodyne detection methods are used for making joint or substantially joint and time-delayed measurements of components of conjugated quadratures of fields of beams reflected/scattered or transmitted/scattered by a measurement object. Referring to FIG. 1a, an interferometer system is shown diagrammatically comprising an interferometer 10, a source 18, a beam-conditioner 22, detector 70, an electronic processor and controller 80, and a measurement object or substrate 60. Source 18 is a pulsed or shuttered source that generates beam 20 comprising one or more frequency and/or polarized components.

Beam 20 is incident on and exits beam-conditioner 22 as input beam 24 with components 24A and 24B that comprise one or more frequency and/or polarized components. The relative orientation of the polarized components may be parallel or orthogonal or at some other angle according to the requirements of an end use application. Each of the polarized components comprises one or more different frequency components. The measurement beam components 24B of input beam 24 are coextensive in space and the corresponding reference beam components 24A are coextensive in space and have the same temporal window function as the temporal window function of the corresponding components of the measurement beam components although measurement beam component 24B and reference beam component 24A may be either spatially separated or spatially coextensive.

Measurement beam 30A incident on substrate 60 is generated either directly from beam 24B or in interferometer 10. Measurement beam 30B is a return measurement beam generated as either a portion of measurement beam 30A reflected/scattered or transmitted/scattered by substrate 60. Return measurement beam 30B is combined with the reference beam in interferometer 10 to form output beam 34.

For homodyne detection methods, output beam 34 is detected by detector 70 to generate either one or more electrical interference signals per source pulse as signal 72. Detector 70 may comprise an analyzer to select common polarization states of the reference and return measurement beam components of beam 34 to form a mixed beam. Alternatively, interferometer 10 may comprise an analyzer to select common polarization states of the reference and return measurement beam components such that beam 34 is a mixed beam.

In practice, known phase shifts are introduced between the reference and measurement beam components of output beam 34 by one or more different techniques. In one technique, phase shifts are introduced between certain of the corresponding reference and measurement beam components of input beam 24 by beam-conditioner 22 as controlled by signals 74 and 92 from electronic processor and controller 80. In another technique, phase shifts are introduced between certain other of the corresponding reference and measurement beam components as a consequence of a non-zero optical path difference between the reference and measurement beam interferometer 10 and corresponding frequency shifts introduced to the certain other components of input beam components 24A and 24B by beam-conditioner 22 and/or source 18 as controlled by signals 74 and 92 from electronic processor and controller 80.

A general description of the temporal encoding and different combinations of temporal, frequency, and polarization encoding used in embodiments of the present invention will first be given prior to presenting formal descriptions. With respect to a general description of temporal encoding, reference is made to FIG. 1b which shows diagrammatically a time sequence of a pulse sequence comprising 4 duplets of pulses from a source such as used when using temporal encoding in the bi-homodyne detection method. The time interval $\tau_T$ (see FIG. 1b) between pulses of a duplet of pulses is much less that than the time $T_r$ between contiguous duplets of pulses, i.e. $\tau_T \ll T_r$. The frequency spectra of the pulses of a duplet of pulses are the same or may be different (non-identical frequency spectra comprising predetermined frequency differences are used in embodiments where a combination of temporal and frequency encoding is used).

Two pulses of a duplet of pulses are associated in a one-to-one mapping with two components of a conjugated quadratures that is being measured. The mapping corresponds to one of a set of two mappings wherein the mappings of the set of mappings are related by a permutation of elements. The set of permutations correspond to elements of a symmetric group of order 2.

Other pulse sequences used in temporal encoding comprise a total of $2N^2$ pulses belonging to 2N N-tuplets of pulses where the time between contiguous pulses of an N-tuplet $\tau_T$ is much less than the time $T_r$ between contiguous N-tuplets. The value of $N \geq 1$. The N pulses of an N-tuplet are associated in a one-to-one mapping with N components of conjugated quadratures that are being measured. The mapping corresponds to one of a set of N mappings or transformations wherein the transformations of the set of N transformations are related by a permutation of elements. The set of permutations corresponds to elements of a symmetric group of order N.

The N mappings are designed such that the N components of conjugated quadratures may be obtained as joint or substantially joint or time-delayed measured quantities.

Reference and measurement beams are generated in the interferometer system for each pulse of an N-tuplet of pulses and the electrical interference signal value generated by a detector element of detector 72 corresponds to the integral of the corresponding portion of mixed beam 34 over the time domain of the N pulses of the N-tuplet of pulses.

The time interval $\tau_T$ is selected such that the fringe visibility corresponding to the N pulses of an N-tuplet is less than a predetermined value. The fringe visibility for the N pulses is measured for example with a Michelson interferometer.

The general descriptions of combinations of temporal, frequency, and polarization encoding are based on extensions of the general description of the temporal encoding. In a combination of temporal, frequency, and polarization encoding, each duplet of pulses of an N-tuplet of pulses comprises one or more frequency components and one or two orthogonal polarization states. The description of the frequency and polarization encoding portion of the general descriptions are the same as corresponding descriptions given in cited U.S. Provisional Patent Applications No. 60/442,858 (47) and No. 60/459,425 (ZI-50) and U.S. patent applications Ser. No. 10/765,368 (ZI-47), and No. 10/816, 180 (ZI-50).

Referring to the bi-homodyne detection method used in embodiments of the present invention, a set of four electrical interference signal values are obtained for each spot on and/or in substrate 60 being imaged. The input beam used with the bi-homodyne detection method comprises a sequence of 4 pulse duplets of pulses wherein each pulse duplet comprises two pulses separated by a time $\tau_T$. The time of the first pulse of the two pulses of pulse duplet j is $t_j$, j=1,2,3,4. The corresponding set of four electrical interference signal values $S_j$, j=1,2,3,4, used for obtaining conjugated quadratures of fields for a single a spot on and/or in a substrate being imaged is represented for the bi-homodyne detection method within a scale factor by the formula $$S_j = P_j \sum_{m=1}^{2} \begin{Bmatrix} \xi_j^2 |A_m|^2 + \zeta_j^2 |B_m|^2 + \eta_j^2 |C_m|^2 + \\ \zeta_j \eta_j 2|B_m||C_m|\cos\varphi_{B_m,C_m,j} + \\ \xi_j \zeta_j 2|A_m||B_m|\cos\varphi_{A_m,B_m,j} + \\ \xi_j \eta_j 2|A_m||C_m|\cos\varphi_{A_m,C_m,j} \end{Bmatrix} \quad (1)$$

where coefficients $A_1$ and $A_2$ represent the amplitudes of two reference beam components generated for the first and second pulses, i.e., m=1 and 2, respectively, of pulse duplet j=1 of the input beam; coefficients $B_1$ and $B_2$ represent the amplitudes of background beam components associated with reference beam components $A_1$ and $A_2$, respectively; coefficients $C_1$ and $C_2$ represent the amplitudes of the return measurement beam components associated with reference beam components $A_1$ and $A_2$, respectively; phases $\varphi_{B_m,C_m,j}$, $\varphi_{A_m,B_m,j}$, and $\varphi_{A_m,C_m,j}$ represent the phase between the background and return measurement beam components, the phase between the reference and background beam components, and the phase between the reference and return measurement beam components, respectively, for the pulse specified by (m,j); and $P_j$ represents the integrated intensity of the first pulse or m=1 pulse of pulse duplet j. The parameters $\xi_j$, $\zeta_j$, and $\eta_j$ represent effects of variations in properties of a conjugate set of four pinholes such as size and shape if used in the generation of the spot on and/or in substrate 60 and the sensitivities of a conjugate set of four detector pixels corresponding to the spot on and/or in substrate 60 for the reference, the background, and the return measurement beam components, respectively.

Interference cross terms between electric field components associated with the m=1 and 2 pulses of a pulse duplet such as represented by $A_1 A_2$ and $A_1 C_2$ are omitted in Eq. (1). In the homodyne detection methods as described in preceding paragraphs, the affect of such terms is reduced to a negligible level through the selection of the value of $\tau_T$, i.e. $\tau_T$ is selected such that the interference cross terms are less than a predetermined value.

If in a given end use application the interference cross terms are not negligible, corrections can be made for the larger $A_1 A_2$ type term and portions of the $A_1 B_2$ type terms using measured values of the conjugated quadratures of the respective components of the input beam to the interferometer and using measured values of the electrical interference signal values with the substrate 60 removed using the bi-homodyne detection method. Another way to determine and eliminate the effects of the interference cross terms is to measure the electrical interference signal values as a function of $\tau_T$ and process the corresponding measured quantities to identify and eliminate the effects of the interference cross terms.

It is assumed in Eq. (1) that the ratio of $|A_2|/|A_1|$ is not dependent on j or on the value of $P_j$. In order to simplify the representation of $S_j$ so as to project the important features without departing from either the scope or spirit of the present invention, it is also assumed in Eq. (1) that the ratio of the amplitudes of the return measurement beams associated with $A_2$ and $A_1$ is not dependent on j or on the value of $P_j$. However, the ratio $|C_2|/|C_1|$ will be different from the ratio $|A_2|/|A_1|$ when the ratio of the amplitudes of the measurement beam components associated with $A_2$ and $A_1$ are different from the ratio $|A_2|/|A_1|$.

The phase $\phi_{A_m C_m, j}$ relative to phase $\phi A_1, C_1, 1$, is controlled in the bi-detection method by conditioning of the input beam to interferometer 10 and is expressed in the formula as $$\varphi_{A_m C_m, j} = \varphi_{A_1 C_1, 1} - \frac{\pi}{2}(m - p_j + 1) - \pi \varepsilon_{m, j} \quad (2)$$

where parameter $p_j$ serves the role of a permutation operator switching the relationship or the one-to-one mapping between the two pulses of a pulse duplet j and the components of a corresponding conjugated quadratures when $p_j$ changes from 0 to 1 or from 1 to 0 and the change in the values of $\varepsilon_{m,j}$ from 1 to −1 or from −1 to 1 corresponds to changes in relative phases of $\pi$ between respective reference and measurement beam components.

The set of values used for $p_j$ and $\varepsilon_{m,j}$ for different values of m and j will depend in part on whether the components of the measured conjugated quadratures are to be joint measurements or non-joint measurements. The average times $\bar{t}_{d1}$ and $\bar{t}_{d2}$ of the times of the respective pulses of the duplets of pulses corresponding to components of the conjugated quadratures that are associated with $\cos \phi_{A_1 C_1}$ and $\sin \phi_{A_1 C_1}$, respectively, are given by the equations $$\bar{t}_{d1} = \frac{1}{4}\left[\sum_{j=1}^{4} t_j + \tau_T \sum_{j=1}^{4} p_j\right], \quad (3)$$

$$\bar{t}_{d2} = \frac{1}{4}\left[\sum_{j=1}^{4} t_j + \tau_T \sum_{j=1}^{4} (1 - p_j)\right] \quad (4)$$

where $t_j$ is the time of the m=1 pulse of pulse duplet j. The difference in the two average times is obtained using Equations (3) and (4) with the result $$\bar{t}_{d2} - \bar{t}_{d1} = \tau_T\left[1 - \frac{1}{2}\sum_{j=1}^{4} p_j\right]. \quad (5)$$

It is apparent from Eq. (5) that the difference between the two average times can be arranged to be zero by selecting the set of values of $p_j$ such that $$\sum_{j=1}^{4} p_j = 2. \quad (6)$$

It is also apparent from Eq. (5) that the difference between the two average times $\bar{t}_{d1}$ and $\bar{t}_{d2}$ can be arranged to be non-zero by selecting the set of values of $p_j$ such that the sum of $p_j$ over the domain of j is different from the value of 2. It is important to note that in this case where the difference in the average times is non-zero, the first and second components of conjugated quadratures corresponding to the average times $\bar{t}_{d1}$ and $\bar{t}_{d2}$ may either be two different components of a conjugated quadratures or the same component of two different conjugated quadratures.

The statement that components of conjugated quadratures were obtained from information that was acquired at the same average times means that first and higher odd order temporal effects of the components changing with time cancel in the information represented by the components. Thus, when a characteristic time for changes in the components is longer than or of the order of $\tau_T$, the temporal effects of the components changing with time contribute with corresponding reduced effects only in second and higher even order temporal effects. Accordingly, the components may be referred to as components acquired as joint measurements up to second and higher even order effects.

When the components of conjugated quadratures are obtained from information that was acquired at different average times, the first order and higher odd order temporal effects of the components changing with time do not cancel in the information represented by the components. In this case when a characteristic time for changes in the components is longer than or of the order of $\tau_T$, the relative information represented by the components of the conjugated quadratures contains information about the first and higher temporal derivatives of the components. Accordingly, the components may be referred to as components acquired as non-joint measurements up to first and higher order effects. Measurements of such first and higher order effects can be used in end use applications for example to measure the thermal or acoustic responses of a surface of a measurement object to a laser pulse. The laser pulse may be one of the components or a separate pulse that precedes the measurement of the components.

The change in phase $\phi_{A_m B_m, j}$ for a change in $\varepsilon_{m,j}$ of ±1 may be different from $\pi$ in embodiments depending on where and how the background beam is generated. It may be of value in evaluating the effects of the background beams to note that the factor $\cos \phi_{B_m C_m, j}$ may be written as $\cos[\phi_{A_m C_m} + (\phi_{B_m C_m, j} - \phi_{A_m C_m})]$ where the phase difference $(\phi_{B_m C_m, j} - \phi_{A_m C_m})$ is the same as the phase $-\phi_{A_m B_m, j}$, i.e., $\cos \phi_{B_m C_m, j} = \cos(\phi_{A_m C_m} - \phi_{A_m B_m, j})$.

Eq. (1) is rewritten using the phase relationship given by Eq. (2) as $$S_j = P_j \sum_{m=1}^{2} \rho_m \begin{Bmatrix} \xi_j^2|A_m|^2 + \zeta_j^2|B_m|^2 + \eta_j^2|C_m|^2 + \\ \xi_j \zeta_j 2|A_m||B_m|\cos\varphi_{A_m, B_m, j} + \\ \xi_j \eta_j 2|A_m||C_m|\cos(\varphi_{A_1 C_1} - \vartheta_{m,p,j}) + \\ \zeta_j \eta_j 2|B_m||C_m|\cos\varphi_{B_m, C_m, j} \end{Bmatrix} \quad (7)$$

where $$\vartheta_{m,p,j} \equiv \frac{\pi}{2}(m - p_j + 1) - \pi \varepsilon_{m, j}. \quad (8)$$

In order to make it easier to identify and separate out the conjugated quadratures terms associated with the factors $\cos \phi_{A_1 C_1, 1}$ and $\sin \phi_{A_1 C_1, 1}$ in Eq. (7), terms in Eq. (7) are expanded to yield the following equation:

$$S_j = P_j \sum_{m=1}^{2} \begin{Bmatrix} \xi_j^2|A_m|^2 + \zeta_j^2|B_m|^2 + \eta_j^2|C_m|^2 + \\ \xi_j \zeta_j 2|A_m||B_m|\cos\varphi_{A_m, B_m, j} + \\ \cos\vartheta_{m,p,j}\xi_j\eta_j 2|A_m||C_m|\cos\varphi_{A_1 C_1} + \\ \sin\vartheta_{m,p,j}\xi_j\eta_j 2|A_m||C_m|\sin\varphi_{A_1 C_1} + \\ \zeta_j\eta_j 2|B_m||C_m|\cos\varphi_{B_m, C_m, j} \end{Bmatrix}. \quad (9)$$

Information about conjugated quadratures associated with $\cos\phi_{A_1C_1}$ and $\sin\phi_{A_1C_1}$ are obtained using properties of the $\cos\theta_{m,p,j}$ and $\sin\theta_{m,p,j}$ factors as represented by the following digital filters applied to the signal value $S_j$:

$$F_1(S) = \sum_{j=1}^{4}\sum_{m=1}^{2} \cos\theta_{m,p_j,j} \frac{S_j}{P'_j\xi'^2_j} \frac{1}{|A'_{1+p_j}|^2} \quad (10)$$

$$= \sum_{j=1}^{4}\sum_{m=1}^{2} \cos\theta_{m,p_j,j} \frac{|A_m|^2}{|A'_{1+p_j}|^2}\left(\frac{P_j}{P'_j}\right)\left(\frac{\xi_j^2}{\xi'^2_j}\right) +$$

$$\sum_{j=1}^{4}\sum_{m=1}^{2} \cos\theta_{m,p_j,j} \frac{|B_m|^2}{|A'_{1+p_j}|^2}\left(\frac{P_j}{P'_j}\right)\left(\frac{\zeta_j^2}{\xi'^2_j}\right) +$$

$$\sum_{j=1}^{4}\sum_{m=1}^{2} \cos\theta_{m,p_j,j} \frac{|C_m|^2}{|A'_{1+p_j}|^2}\left(\frac{P_j}{P'_j}\right)\left(\frac{\eta_j^2}{\xi'^2_j}\right) +$$

$$2\cos\varphi_{A_1C_1}\sum_{j=1}^{4}\sum_{m=1}^{2}\cos^2\theta_{m,p_j,j}\frac{|A_m||C_m|}{|A'_{1+p_j}|^2}\left(\frac{P_j}{P'_j}\right)\left(\frac{\xi_j\eta_j}{\xi'^2_j}\right) +$$

$$2\sin\varphi_{A_1C_1}\sum_{j=1}^{4}\sum_{m=1}^{2}\cos\theta_{m,p_j,j}\sin\theta_{m,p_j,j}\frac{|A_m||C_m|}{|A'_{1+p_j}|^2}\left(\frac{P_j}{P'_j}\right)\left(\frac{\xi_j\eta_j}{\xi'^2_j}\right) +$$

$$2\sum_{j=1}^{4}\sum_{m=1}^{2}\cos\theta_{m,p_j,j}\cos\varphi_{A_mB_m,j}\frac{|A_m||B_m|}{|A'_{1+p_j}|^2}\left(\frac{P_j}{P'_j}\right)\left(\frac{\xi_j\zeta_j}{\xi'^2_j}\right) +$$

$$2\sum_{j=1}^{4}\sum_{m=1}^{2}\cos\theta_{m,p_j,j}\cos\varphi_{B_mC_m,j}\frac{|B_m||C_m|}{|A'_{1+p_j}|^2}\left(\frac{P_j}{P'_j}\right)\left(\frac{\zeta_j\eta_j}{\xi'^2_j}\right),$$

$$F_2(S) = \sum_{j=1}^{4}\sum_{m=1}^{2} \sin\theta_{m,p_j,j} \frac{S_j}{P'_j\xi'^2_j} \frac{1}{|A'_{1-p_j}|^2} \quad (11)$$

$$= \sum_{j=1}^{4}\sum_{m=1}^{2} \sin\theta_{m,p_j,j} \frac{|A_m|^2}{|A'_{2-p_j}|^2}\left(\frac{P_j}{P'_j}\right)\left(\frac{\xi_j^2}{\xi'^2_j}\right) +$$

$$\sum_{j=1}^{4}\sum_{m=1}^{2} \sin\theta_{m,p_j,j} \frac{|B_m|^2}{|A'_{2-p_j}|^2}\left(\frac{P_j}{P'_j}\right)\left(\frac{\zeta_j^2}{\xi'^2_j}\right) +$$

$$\sum_{j=1}^{4}\sum_{m=1}^{2} \sin\theta_{m,p_j,j} \frac{|C_m|^2}{|A'_{2-p_j}|^2}\left(\frac{P_j}{P'_j}\right)\left(\frac{\eta_j^2}{\xi'^2_j}\right) +$$

$$2\cos\varphi_{A_1C_1}\sum_{j=1}^{4}\sum_{m=1}^{2}\sin\theta_{m,p_j,j}\cos\theta_{m,p_j,j}\frac{|A_m||C_m|}{|A'_{2-p_j}|^2}\left(\frac{P_j}{P'_j}\right)\left(\frac{\xi_j\eta_j}{\xi'^2_j}\right) +$$

$$2\sin\varphi_{A_1C_1}\sum_{j=1}^{4}\sum_{m=1}^{2}\sin^2\theta_{m,p_j,j}\frac{|A_m||C_m|}{|A'_{2-p_j}|^2}\left(\frac{P_j}{P'_j}\right)\left(\frac{\xi_j\eta_j}{\xi'^2_j}\right) +$$

$$2\sum_{j=1}^{4}\sum_{m=1}^{2}\sin\theta_{m,p_j,j}\cos\varphi_{A_mB_m,j}\frac{|A_m||B_m|}{|A'_{2-p_j}|^2}\left(\frac{P_j}{P'_j}\right)\left(\frac{\xi_j\zeta_j}{\xi'^2_j}\right) +$$

$$2\sum_{j=1}^{4}\sum_{m=1}^{2}\sin\theta_{m,p_j,j}\cos\varphi_{B_mC_m,j}\frac{|B_m||C_m|}{|A'_{2-p_j}|^2}\left(\frac{P_j}{P'_j}\right)\left(\frac{\zeta_j\eta_j}{\xi'^2_j}\right).$$

where $|A'_{1+p_j}|$ and $|A'_{2-p_j}|$ are values used in the digital filter to compensate for differences in $|A_1|$ and $|A_2|$ and $\xi'_j$ and $P'_j$ are values used in the digital filters to compensate structure in $\xi_j$, and $P_j$, respectively.

Noting that $|C_{1+p_j}|/|A_{1+p_j}|=|C_1|/|A_1|$ and that $|C_{2-p_j}|/|A_{2-p_j}|=|C_2|/|A_2|$, Eqs. (10) and (11) are further simplified as bi-homodyne detection method exhibit the important properties are listed in Table 1. Note that the condition given by Eq. (6) is satisfied for the values of $p_j$ listed in Table 1. The corresponding values for $\cos\theta_{m,p_j,j}$ and $\sin\theta_{m,p_j,j}$ are listed in Tables 2 and 3, respectively, as a function of m and j.

$$F_1(S) = \sum_{j=1}^{4}\sum_{m=1}^{2}\cos\theta_{m,p_j,j}\frac{|A_{1+p_j}|^2}{|A'_{1+p_j}|^2}\left(\frac{P_j}{P'_j}\right)\left(\frac{\xi_j^2}{\xi'^2_j}\right)+ \qquad (12)$$

$$\frac{|B_1|^2}{|A_1|^2}\sum_{j=1}^{4}\sum_{m=1}^{2}\cos\theta_{m,p_j,j}\frac{|A_{1+p_j}|^2}{|A'_{1+p_j}|^2}\left(\frac{P_j}{P'_j}\right)\left(\frac{\zeta_j^2}{\xi'^2_j}\right)+$$

$$\frac{|C_1|^2}{|A_1|^2}\sum_{j=1}^{4}\sum_{m=1}^{2}\cos\theta_{m,p_j,j}\frac{|A_{1+p_j}|^2}{|A'_{1+p_j}|^2}\left(\frac{P_j}{P'_j}\right)\left(\frac{\eta_j^2}{\xi'^2_j}\right)+$$

$$2\frac{|C_1|}{|A_1|}\cos\varphi_{A_1C_1}\sum_{j=1}^{4}\sum_{m=1}^{2}\cos^2\theta_{m,p_j,j}\frac{|A_{1+p_j}|^2}{|A'_{1+p_j}|^2}\left(\frac{P_j}{P'_j}\right)\left(\frac{\xi_j\eta_j}{\xi'^2_j}\right)+$$

$$2\frac{|C_1|}{|A_1|}\sin\varphi_{A_1C_1}\sum_{j=1}^{4}\sum_{m=1}^{2}\cos\theta_{m,p_j,j}\sin\theta_{m,p_j,j}\frac{|A_{1+p_j}|^2}{|A'_{1+p_j}|^2}\left(\frac{P_j}{P'_j}\right)\left(\frac{\xi_j\eta_j}{\xi'^2_j}\right)+$$

$$2\frac{|B_1|}{|A_1|}\sum_{j=1}^{4}\sum_{m=1}^{2}\cos\theta_{m,p_j,j}\cos\varphi_{A_mB_m,j}\frac{|A_{1+p_j}|^2}{|A'_{1+p_j}|^2}\left(\frac{P_j}{P'_j}\right)\left(\frac{\xi_j\zeta_j}{\xi'^2_j}\right)+$$

$$2\frac{|B_1||C_1|}{|A_1|^2}\sum_{j=1}^{4}\sum_{m=1}^{2}\cos\theta_{m,p_j,j}\cos\varphi_{B_mC_m,j}\frac{|B_m||C_m|}{|A'_{1+p_j}|^2}\left(\frac{P_j}{P'_j}\right)\left(\frac{\xi_j\eta_j}{\xi'^2_j}\right),$$

$$F_2(S) = \sum_{j=1}^{4}\sum_{m=1}^{2}\sin\theta_{m,p_j,j}\frac{|A_{2-p_j}|^2}{|A'_{2-p_j}|^2}\left(\frac{P_j}{P'_j}\right)\left(\frac{\xi_j^2}{\xi'^2_j}\right)+ \qquad (13)$$

$$\frac{|B_1|^2}{|A_1|^2}\sum_{j=1}^{4}\sum_{m=1}^{2}\sin\theta_{m,p_j,j}\frac{|A_{2-p_j}|^2}{|A'_{2-p_j}|^2}\left(\frac{P_j}{P'_j}\right)\left(\frac{\zeta_j^2}{\xi'^2_j}\right)+$$

$$\frac{|C_1|^2}{|A_1|^2}\sum_{j=1}^{4}\sum_{m=1}^{2}\cos\theta_{m,p_j,j}\frac{|A_{2-p_j}|^2}{|A'_{2-p_j}|^2}\left(\frac{P_j}{P'_j}\right)\left(\frac{\eta_j^2}{\xi'^2_j}\right)+$$

$$2\frac{|C_1|}{|A_1|}\cos\varphi_{A_1C_1}\sum_{j=1}^{4}\sum_{m=1}^{2}\sin\theta_{m,p_j,j}\cos\theta_{m,p_j,j}\frac{|A_{2-p_j}|^2}{|A'_{2-p_j}|^2}\left(\frac{P_j}{P'_j}\right)\left(\frac{\xi_j\eta_j}{\xi'^2_j}\right)+$$

$$2\frac{|C_1|}{|A_1|}\sin\varphi_{A_1C_1}\sum_{j=1}^{4}\sum_{m=1}^{2}\sin^2\theta_{m,p_j,j}\frac{|A_{2-p_j}|^2}{|A'_{2-p_j}|^2}\left(\frac{P_j}{P'_j}\right)\left(\frac{\xi_j\eta_j}{\xi'^2_j}\right)+$$

$$2\frac{|B_1|}{|A_1|}\sum_{j=1}^{4}\sum_{m=1}^{2}\sin\theta_{m,p_j,j}\cos\varphi_{A_mB_m,j}\frac{|A_{2-p_j}|^2}{|A'_{2-p_j}|^2}\left(\frac{P_j}{P'_j}\right)\left(\frac{\xi_j\zeta_j}{\xi'^2_j}\right)+$$

$$2\frac{|B_1||C_1|}{|A_1|^2}\sum_{j=1}^{4}\sum_{m=1}^{2}\sin\theta_{m,p_j,j}\cos\varphi_{B_mC_m,j}\frac{|A_{2-p_j}|^2}{|A'_{2-p_j}|^2}\left(\frac{P_j}{P'_j}\right)\left(\frac{\xi_j\eta_j}{\xi'^2_j}\right).$$

Important properties of the bi-homodyne detection method are that it is possible to select a set of values of $p_j$ and $\epsilon_{m,j}$ such that the phase represented by a measured conjugated quadratures has reduced sensitivity to certain properties of the interferometer and that joint measurements of the components of the conjugated quadratures can be made. An example set of values of $p_j$ and $\epsilon_{m,j}$ for which the

TABLE 1

$p_j$ and $\epsilon_{m,j}$

| j | $p_j$ | $\epsilon_{1,j}$ | $\epsilon_{2,j}$ |
|---|---|---|---|
| 1 | 0 | 1 | 1 |
| 2 | 1 | −1 | 1 |

TABLE 1-continued $p_j$ and $\epsilon_{m,j}$

| j | $p_j$ | $\epsilon_{1,j}$ | $\epsilon_{2,j}$ |
|---|---|---|---|
| 3 | 1 | 1 | −1 |
| 4 | 0 | −1 | −1 |

TABLE 2

$\cos\theta_{m,p_j,j}$

| j | $p_j$ | $\cos\theta_{1,p_j,j}$ | $\cos\theta_{2,p_j,j}$ |
|---|---|---|---|
| 1 | 0 | 1 | 0 |
| 2 | 1 | 0 | −1 |
| 3 | 1 | 0 | −1 |
| 4 | 0 | 1 | 0 |

It is evident from inspection of Table 2 that the values listed for $\cos\theta_{m,p_j,j}$ for $m-p_j=2$ are zero and the values listed for $\cos\theta_{m,p_j,j}$ for $m-p_j=1$ represent a rectangular function that has a mean value of zero and is symmetric

TABLE 3

$\sin\theta_{m,p_j,j}$

| j | $p_j$ | $\sin\theta_{1,p_j,j}$ | $\sin\theta_{2,p_j,j}$ |
|---|---|---|---|
| 1 | 0 | 0 | 1 |
| 2 | 1 | −1 | 0 |
| 3 | 1 | 1 | 0 |
| 4 | 0 | 0 | −1 | about $j=2.5$. It is evident from inspection of Table 3 that the values listed for $\sin\theta_{m,p_j,j}$ for $m-p_j=1$ are zero and the values listed for $\sin\theta_{m,p_j,j}$ for $m-p_j=2$ represent a rectangular function that has a mean value of zero and is antisymmetric about $j=2.5$. Another important property by the design of the bi-homodyne detection method is that the components of conjugated quadratures associated with $\cos\phi_{A_1C_1}$ and $\sin\phi_{A_1C_1}$ are orthogonal over the range of $j=1,2,3,4\ldots$ Note that certain of the factors in Eqs. (12) and (13) have nominal values of 4 within scale factors, e.g.

$$\sum_{j=1}^{4} \cos^2\theta_{m,p_j,j} \frac{|A_{1+p_j}|^2}{|A'_{1+p_j}|^2}\left(\frac{P_j}{P'_j}\right)\left(\frac{\xi_j\eta_j}{\xi'^2_j}\right) = \tag{14}$$

$$+\sum_{j=1}^{4} \frac{|A_{1+p_j}|^2}{|A'_{1+p_j}|^2}\left(\frac{P_j}{P'_j}\right)\left(\frac{\xi_j\eta_j}{\xi'^2_j}\right) \cong 4.$$

$$\sum_{j=1}^{4} \sin^2\theta_{m,p_j,j} \frac{|A_{2-p_j}|^2}{|A'_{2-p_j}|^2}\left(\frac{P_j}{P'_j}\right)\left(\frac{\xi_j\eta_j}{\xi'^2_j}\right) = \tag{15}$$

$$+\sum_{j=1}^{4} \frac{|A_{2-p_j}|^2}{|A'_{2-p_j}|^2}\left(\frac{P_j}{P'_j}\right)\left(\frac{\xi_j\eta_j}{\xi'^2_j}\right) \cong 4.$$

The scale factors correspond to the average values for the ratio $\xi'_j/\eta_j$ assuming that the average values of $$(|A_{1+p_j}|^2/|A'_{1+p_j}|^2) \cong 1, \; (|A_{2-p_j}|^2/|A'_{2-p_j}|^2) \cong 1,$$

$$(\xi_j/\xi'_j)^2 \cong 1, \text{ and } (P_j/P'_j) \cong 1.$$

Certain other of the factors in Eqs. (12) and (13) have nominal values of zero, e.g.

$$\sum_{j=1}^{4}\sum_{m=1}^{2} \cos\theta_{m,p_j,j} \frac{|A_{1+p_j}|^2}{|A'_{1+p_j}|^2}\left(\frac{P_j}{P'_j}\right)\left(\frac{\xi^2_j}{\xi'^2_j}\right) \cong 0, \tag{16}$$

$$\sum_{j=1}^{4}\sum_{m=1}^{2} \sin\theta_{m,p_j,j} \frac{|A_{2-p_j}|^2}{|A'_{2-p_j}|^2}\left(\frac{P_j}{P'_j}\right)\left(\frac{\xi^2_j}{\xi'^2_j}\right) \cong 0,$$

$$\sum_{j=1}^{4}\sum_{m=1}^{2} \cos\theta_{m,p_j,j} \frac{|A_{1+p_j}|^2}{|A'_{1+p_j}|^2}\left(\frac{P_j}{P'_j}\right)\left(\frac{\zeta^2_j}{\xi'^2_j}\right) \cong 0,$$

$$\sum_{j=1}^{4}\sum_{m=1}^{2} \sin\theta_{m,p_j,j} \frac{|A_{2-p_j}|^2}{|A'_{2-p_j}|^2}\left(\frac{P_j}{P'_j}\right)\left(\frac{\zeta^2_j}{\xi'^2_j}\right) \cong 0,$$

$$\sum_{j=1}^{4}\sum_{m=1}^{2} \cos\theta_{m,p_j,j} \frac{|A_{1+p_j}|^2}{|A'_{1+p_j}|^2}\left(\frac{P_j}{P'_j}\right)\left(\frac{\eta^2_j}{\xi'^2_j}\right) \cong 0,$$

$$\sum_{j=1}^{4}\sum_{m=1}^{2} \sin\theta_{m,p_j,j} \frac{|A_{2-p_j}|^2}{|A'_{2-p_j}|^2}\left(\frac{P_j}{P'_j}\right)\left(\frac{\eta^2_j}{\xi'^2_j}\right) \cong 0.$$

The remaining factors, $$\sum_{j=1}^{4}\sum_{m=1}^{2} \cos\theta_{m,p_j,j}\cos\varphi_{A_mB_m,j} \frac{|A_{1+p_j}|^2}{|A'_{1+p_j}|^2}\left(\frac{P_j}{P'_j}\right)\left(\frac{\xi_j\zeta_j}{\xi'^2_j}\right), \tag{17}$$

$$\sum_{j=1}^{4}\sum_{m=1}^{2} \cos\theta_{m,p_j,j}\cos\varphi_{B_mC_m,j} \frac{|A_{1+p_j}|^2}{|A'_{1+p_j}|^2}\left(\frac{P_j}{P'_j}\right)\left(\frac{\zeta_j\eta_j}{\xi'^2_j}\right),$$

$$\sum_{j=1}^{4}\sum_{m=1}^{2} \sin\theta_{m,p_j,j}\cos\varphi_{A_mB_m,j} \frac{|A_{2-p_j}|^2}{|A'_{2-p_j}|^2}\left(\frac{P_j}{P'_j}\right)\left(\frac{\xi_j\zeta_j}{\xi'^2_j}\right),$$

$$\sum_{j=1}^{4}\sum_{m=1}^{2} \sin\theta_{m,p_j,j}\cos\varphi_{B_mC_m,j} \frac{|A_{2-p_j}|^2}{|A'_{2-p_j}|^2}\left(\frac{P_j}{P'_j}\right)\left(\frac{\zeta_j\eta_j}{\xi'^2_j}\right).$$

will have nominal magnitudes ranging from approximately zero to approximately 4 times a cosine factor and either the average value of factor $$(|A_{1+p_j}|^2/|A'_{1+p_j}|^2)(P_j/P'_j)(\xi_j\zeta_j/\xi'^2_j) \text{ or}$$

$$(|A_{2-p_j}|^2/|A'_{2-p_j}|^2)(P_j/P'_j)(\zeta_j\eta_j/\xi'^2_j)$$

depending on the properties respective phases. For the portion of the background with phases that do not track to a first approximation the phases of the respective measurement beams, the magnitudes of all of the terms listed in the Eq. (17) will be approximately zero. For the portion of the background with phases that do track to a first approximation the phases of the respective measurement beams, the magnitudes of the terms listed in Eq. (17) will be approximately 4 times a cosine factor and either the average value of factor $$(|A_{1+p_j}|^2/|A'_{1+p_j}|^2)(P_j/P'_j)(\xi_j\zeta_j/\xi'^2_j) \text{ and or factor}$$

$$(|A_{2-p_j}|^2/|A'_{2-p_j}|^2)(P_j/P'_j)(\zeta_j\eta_j/\xi'^2_j).$$

The largest terms in Eqs. (12) and (13) are generally the first terms in each of the right hand side of Eqs. (12) and (13). Other large terms in Eqs. (12) and (13) are the second terms in each of the right hand side of Eqs. (12) and (13). However, the respective terms are substantially eliminated in embodiments of the present invention by selection of $$\xi'_j, |A'_{1+p_j}|^2, \text{ and } |A'_{2-p_j}|^2$$

values according to the first four equations of Eqs. (16).

The largest contribution from effects of background terms corresponding to sixth terms in each of the right hand side of Eqs. (12) and (13) represents the contribution of the interference between the reference beam and the portion of the background beam generated by the measurement beam 30A. This portion of the effect of the background can be measured in embodiments of the present invention by measuring the corresponding conjugated quadratures of the portion of the background with the return measurement beam component of beam 32 set equal to zero, i.e., measuring the respective electrical interference signals $S_j$ with substrate 60 removed and with either $$|A_{1+p_j}| = 0 \text{ or } |A_{2-p_j}| = 0$$

and visa versa. The measured conjugated quadratures of the portion of the effect of the background can then be used to compensate for the respective background effects beneficially in an end use application if required.

Information about the largest contribution from effects of background amplitude $2\xi_j\zeta_j|A_1||B_1|$ and phase $\phi_{A_1B_1,j}$, i.e. the interference term between the reference beam and the portion of background beam generated by the measurement beam 30A, may also be obtained by measuring $S_j$ for j=1,2,3,4 as a function of relative phase shift between reference beam and the measurement beam 30A with substrate 60 removed and either $|A_2|=0$ or $|A_1|=0$ and visa versa and Fourier analyzing the measured values of $S_j$. Such information can be used to help identify the origin of the respective background.

Other techniques may be incorporated into embodiments of the present invention to reduce and/or compensate for the effects of background beams without departing from either the scope or spirit of the present invention such as described in commonly owned U.S. Pat. No. 5,760,901 (ZI-05) entitled "Method And Apparatus For Confocal Interference Microscopy With Background Amplitude Reduction and Compensation," U.S. Pat. No. 5,915,048 (ZI-02) entitled "Method and Apparatus for Discrimination In-Focus Images from Out-of-Focus Light Signals from Background and Foreground Light Sources," and U.S. Pat. No. 6,480,285 B1 (ZI-08) wherein each of the three patents are by Henry A. Hill. The contents of each of the three cited patents are herein incorporated in their entirety by reference.

The selection of values for $\xi'_j$ is based on information about coefficients $\xi_j$ for j=1,2,3,4 that may be obtained by measuring the $S_j$ for j=1,2,3,4 with only the reference beam present in the interferometer system. In certain embodiments of the present invention, this may correspond simply blocking the measurement beam components of input beam component 24B and in certain other embodiments, this may correspond to simply measuring the $S_j$ for j=1,2,3,4 with substrate 60 removed. A test of the correctness of a set of values for $\xi'_j$ is the degree to which the first terms in each of the right hand side of Eqs. (12) and (13) are zero.

Information about coefficients $\xi_j\eta_j$ for j=1,2,3,4 may be obtained by scanning an artifact past the spots corresponding to the respective four conjugate detector pixels with either $|A_2|=0$ or $|A_1|=0$ and measuring the conjugated quadratures component $2|A_1||C_1| \cos \phi_{A_1C_1}$ or $2|A_1||C_1|\sin \phi_{A_1C_1}$, respectively. A change in the amplitude of the $2|A_1||C_1| \cos \phi_{A_1C_1}$ or $2|A_1||C_1|\sin \phi_{A_1C_1}$ term corresponds to a variation in $\xi_j\eta_j$ as a function of j. Information about the coefficients $\xi_j\eta_j$ for j=1,2,3,4 may be used for example to monitor the stability of one or more elements of interferometer system 10.

The bi-homodyne detection method is a robust technique for the determination of conjugated quadratures of fields. First, the conjugated quadratures $|C_1| \cos \phi_{A_1C_1}$ and $|C_1| \sin \phi_{A_1C_1}$ are the primary terms in the digitally filtered values $F_1$ (S) and $F_2$ (S), respectively, as expressed by Eqs. (12) and (13), respectively, since as noted in the discussion with respect to Eqs. (16), the first and second terms in each of the right hand side of Eqs. (12) and (13) are substantially zero.

Secondly, the coefficients of $|C_1| \cos \phi_{A_1C_1}$ and $|C_2| \sin \phi_{A_1C_1}$ terms in Eqs. (12) and (13) are identical when $$|A'_{1+p_j}| \text{ and } |A'_{2-p_j}|$$

are selected such that $$\frac{|A'_{1+p_j}|}{|A'_{2-p_j}|} = \frac{|A_{1+p_j}|}{|A_{2-p_j}|}. \quad (18)$$

Thus highly accurate measurements of the interference terms between the return measurement beam and the reference beam with respect to amplitudes and in particular phases, i.e. highly accurate measurements of conjugated quadratures of fields can be measured wherein first order variations in $\xi_j$ and first order errors in normalizations such as $(P_j/P'_j)$, $(\xi_j^2/\xi'^2_j)$, and $$|A'_{1+p_j}|/|A'_{2-p_j}|$$

enter in only second or higher order. This property translates into a significant advantage. Also, the contributions to each component of the conjugated quadratures $|C_1| \cos \phi_{A_1C_1}$ and $|C_2| \sin \phi_{A_1C_1}$ from a respective set of four electrical interference signal values may have the same average time of measurement when the condition set out in Eq. (6) and thus may be obtained as jointly determined values.

Other distinguishing features of the bi-homodyne technique are evident in Eqs. (12) and (13): the coefficients of the conjugated quadratures $|C_1| \cos \phi_{A_1C_1}$ and $|C_1| \sin \phi_{A_1C_1}$ in Eqs. (12) and (13) respectively, are identical when $$|A'_{1+p_j}| \text{ and } |A'_{2-p_j}|$$

are selected such that the condition set out in Eq. (18) is satisfied independent of errors in assumed values for $\xi'_j$. Thus highly accurate values of the phases corresponding to conjugated quadratures can be measured with first order variations in $\xi_j$ and first order errors in normalizations such as $(P_j/P'_j)$ and $(\xi_j^2/\xi_j'^2)$ enter in only through some high order effect.

It is also evident that since the conjugated quadratures of fields are obtained jointly when using the bi-homodyne detection method, there is a significant reduction in the potential for an error in tracking phase as a result of a phase redundancy unlike the situation possible in single-homodyne detection of conjugated quadratures of fields.

It is relevant to note that the bi-homodyne detection method is equivalent or reduces to the bi-homodyne detection method in cited U.S. Provisional Patent Application No. 60/442,858 (ZI-47) and U.S. patent application Ser. No. 10/765,368 (ZI-47) when $p_j=0$ for $j=1,2,3$, and 4 and $m=1$ and 2 corresponds to two different frequencies of an input beam.

There are a number of advantages of the bi-homodyne detection method as a consequence of the conjugated quadratures of fields being jointly or substantially jointly and the time delayed acquired quantities. One advantage is a reduced sensitivity the effects of an overlay error of a spot in or on the substrate that is being imaged and a conjugate image of conjugate pixel of a multipixel detector during the acquisition of four electrical interference signal values of each spot in and/or on a substrate imaged using interferometric far-field and/or near-field confocal and non-confocal microscopy. Overlay errors are errors in the set of four conjugate images of a respective set of conjugate detector pixels relative to the spot being imaged.

Another advantage is that when operating in the scanning mode there is a reduced sensitivity to effects of pinhole-to-pinhole variations in properties of a conjugate set of pinholes used in a confocal microscopy system that are conjugate to a spot in or on the substrate being imaged at different times during the scan.

Another advantage is that when operating in the scanning mode there is a reduced sensitivity to effects of pixel-to-pixel variation of properties within a set of conjugate pixels that are conjugate to a spot in or on the substrate being imaged at different times during the scan.

Another advantage is that when operating in the scanning mode there is reduced sensitivity to effects of pulse sequence to pulse sequence variations of a respective conjugate set of pulse sequences of the input beam 24 to interferometer system 10.

The pinholes and pixels of a multipixel detector of a set of conjugate pinholes and conjugate pixels of a multipixel detector may comprise contiguous pinholes of an array of pinholes and/or contiguous pixels of a multipixel detector or may comprise selected pinholes from an array of pinholes and/or pixels from an array of pixels wherein the separation between the selected pinholes is an integer number of pinhole spacings and the separation between an array of respective pixels corresponds to an integer number of pixel spacings without loss of lateral and/or longitudinal resolution and signal-to-noise ratios. The corresponding scan rate would be equal to the integer times the spacing of spots on the measurement object 60 conjugate to set of conjugate pinholes and/or set of conjugate pixels divided by the read out rate of the multipixel detector. This property permits a significant increase in throughput for an interferometric far-field or near-field confocal or non-confocal microscope with respect to the number of spots in and/or on a substrate imaged per unit time.

The description of the bi-homodyne detection method can be generalized to cover the description of the homodyne detection method for measuring N components of conjugated quadratures using 2N N-tuplets of pulses. A simple example for N=4 is the contiguous combination of two bi-homodyne detection methods. The first two pulses of the 4-tuplet are used for the first of two conjugated quadratures being measured and the last two pulses of the 4-tuplet are used for the second of two conjugated quadratures being measured.

There are different ways to configure source 18 and beam-conditioner 22 to meet the input beam requirements of the different embodiments of the present invention. Examples of beam-conditioners that may be used in frequency encoding embodiments comprise combinations of multiple-frequency generators and phase shifting type of beam-conditioners such as described in cited U.S. Provisional Patent Applications No. 60/442,858 (ZI-47) and No. 60/459,425 (ZI-50) and U.S. patent application Ser. No. 10/765,368 (ZI-47), and No. 10/816,180 (ZI-50).

With a continuation of the description of different ways to configure source 18 and beam-conditioner 22 to meet the input beam requirements of different embodiments of the present invention, source 18 will preferably comprise a pulsed source. There are a number of different ways for producing a pulsed source [see Chapter 11 entitled "Lasers", *Handbook of Optics*, 1, 1995 (McGraw-Hill, New York) by W. Silfvast]. Each pulse of source 18 may comprise a single pulse or a train of pulses such as generated by a mode locked Q-switched Nd:YAG laser.

Source 18 may be configured in certain embodiments of the present invention to generate two or more frequencies by techniques such as described in a review article entitled "Tunable, Coherent Sources For High-Resolution VUV and XUV Spectroscopy" by B. P. Stoicheff, J. R. Banic, P. Herman, W. Jamroz, P. E. LaRocque, and R. H. Lipson in *Laser Techniques for Extreme Ultraviolet Spectroscopy*, T. J. McIlrath and R. R. Freeman, Eds., (American Institute of Physics) pp 19 (1982) and references therein. The techniques include for example second and third harmonic generation and parametric generation such as described in the articles entitled "Generation of Ultraviolet and Vacuum Ultraviolet Radiation" by S. E. Harris, J. F. Young, A. H. Kung, D. M. Bloom, and G. C. Bjorklund in *Laser Spectroscopy I*, R. G. Brewer and A. Mooradi, Eds. (Plenum Press, New York) pp 59, (1974) and "Generation of Tunable Picosecond VUV Radiation" by A. H. Kung, Appl. Phys. Lett. 25, p 653 (1974). The contents of the three cited articles are herein incorporated in their entirety by reference.

Coherent radiation in the UV, VUV, and EUV regions is generated in source 18 by frequency conversion based on either four-wave frequency mixing in rare gases and in metal vapors based on third order non-linear processes (or frequency mixing of laser radiation) in rare gases and in metal vapors such as described in a cited review article entitled "Tunable, Coherent Sources For High-Resolution VUV and XUV Spectroscopy" by B. P. Stoicheff, J. R. Banic, P. Herman, W. Jamroz, P. E. LaRocque, and R. H. Lipson.

Frequency conversion into the VUV and XUV regions has been achieved by a variety of laser systems. High power pulsed lasers such as ruby, Nd:YAG, Nd in glass, flashlamp pumped dye (PPD), rare gas excimer, and rare gas halide exciplex lasers provide the primary coherent radiation. In some systems, tunable radiation from dye lasers (>320 nm) is used directly, and in others laser radiation (>400 nm) is doubled once or twice in nonlinear crystals to produce coherent radiation in the UV to about 200 nm. Subsequently, the coherent UV radiation is converted to coherent VUV and XUV by THG or frequency mixing in rare gases or metal vapors. Specific atomic (and molecular) systems are selected because of their large third order nonlinear susceptibility, negative dispersion for phase matching, suitability of energy levels for resonance enhancement, and low absorption at the desired VUV or XUV wavelength.

The nonlinear media and laser systems used to generate tunable, coherent, VUV and XUV radiation are summarized in Tables 1 and 2, along with their regions of tunability.

The two earliest systems used to generate coherent, tunable radiation in the VUV and XUV regions have se the pattern for recent work. In FIG. 3 is shown the method developed by S. E. Harris, J. F. Young, A. H. Kung, D. M. Bloom, and G. C. Bjorklund, in *Laser Spectroscopy I*, R. G. Brewer and A. Mooradi, Eds. (Plenum Press, New York) p 59, (1974) at Stanford University. The primary laser source was a mode-locked Nd:YAG laser and amplifier producing 1.06 μm radiation in

TABLE 4

Tunable Generation in Rare Gases

| λ (nm) | Nonlinear Medium | Processes | Primary Laser |
|---|---|---|---|
| 206–160[a] | Xe | $2\lambda_{UV} - \lambda_L$ | Nd:YAG-Dye |
| 195–163 | Xe | $2 \times 266 \pm \lambda_s, \lambda_i$[b] | Nd:YAG and PO[b] |
| 147–118 | Xe | $2 \times 266 \pm \lambda_s, \lambda_i$[b] | Nd:YAG and PO[b] |
| 147–140 | Xe:Kr | $3\lambda_{Dye}$ | Nd:YAG-Dye |
| 130–110[a] | Kr | $2\lambda_{UV} + \lambda_L$ | Nd:YAG-Dye |
| 123.6–120.3 | Kr | $3\lambda_{Dye}$ | KrF-Dye |
| 123.5–120 | Kr:Ar | $3\lambda_{Dye}$ | Nd:YAG-Dye |
| 121.6[c] | Kr | $3 \times 364.8$ | FPD |
| 121.6[c] | Kr | $3 \times 364.8$ | Nd:YAG-Dye |
| 106[c] | Xe | $3 \times 318$ | KrF-Dye |
| 102.7[d] | Ar | $3 \times 308$ | XeCl |
| 83[d] | Xe | $3 \times 248$ | cw Dye, Kr-Dye |
| 79[c] | H$_2$ | $2 \times 193.6 + \lambda_D$ | ArF, Dye |
| 64[d] | Ar, H$_2$, Kr | $3 \times 193.6$ | cw Dye, ArF-Dye |
| 57[d] | Ar | $3 \times 171$ | Xe$_2$ |

[a]$\lambda_{UV}$ from a range of dye lasers.
[b]PO = parametric oscillator (signal and idler wavelengths $\lambda_s$, $\lambda_i$).
[c]Tunable over a small region.
[d]Tunable over the laser bandwidth.

TABLE 5

Tunable Generation in Metal Vapors

| Nonlinear Medium (Ioniiz. Limit in nm) | λ (nm) | Primary Laser |
|---|---|---|
| Sr(217.8) | 200–190 | Nd:Glass-Dye |
|  | 195.7–177.8 | N$_2$-Dye |
| Mg(162.1) | 174–145 | N$_2$-Dye |
|  | 160–140 | N$_2$-Dye |
|  | 129–121 | KrF-Dye |

TABLE 5-continued

Tunable Generation in Metal Vapors

| Nonlinear Medium (Ioniiz. Limit in nm) | λ (nm) | Primary Laser |
|---|---|---|
| Be(133.0) | 123–121 | Nd:YAG-Dye |
| Zn(132.0) | 140–106 | XeCl/KrF-Dye |
| Hg(118.0) | 125.1–117.4 | Nd:YAG-Dye |
|  | 115.0–93.0 | Nd:YAG-Dye | pulses of 50 psec duration, and peak power ~20 MW. This radiation was doubled to 532 nm in a KDP crystal, and then used directly, or doubled again, or mixed with 1.06 μm radiation in a second KDP crystal, to produce radiation at 532, 266, or 355 nm radiation with ~10% efficiency. In this way, high-power radiation at several fixed wavelengths was available for mixing to shorter wavelengths in metal vapors and rare gases. Experiments in a Cd:Ar phase-matched mixture produced summing of 1064 nm and 2×354.7 nm to yield 152 nm radiation, and tripling of 532 nm radiation and of 354.7 nm radiation to yield 177.3 and 118.2 nm radiation, respectively. In a phase-matched mixture of Xe:Ar, THG of 354.7 nm radiation to 118.2 nm radiation was achieved, and in Ar, THG of 266 nm radiation to 88.7 nm radiation was achieved.

Tunability was added to this coherent source by using the 266 nm radiation to pump an ADP parametric generator [A. H. Kung, *Appl. Phys. Lett.* 25, pp 653 (1974)]. Variation of the crystal temperature from 50° to 105° C. provided a tuning range of 420 nm to 720 nm, with >100 μJ output in a bandwidth of 0.5 to 2 nm. The pump (266 nm) and resulting signal and idler radiation was then focused onto Xe gas (at pressures up to 1 atm). THG and sum and difference mixing produced VUV radiation tunable over portions of the region from 118 nm to 147 nm and continuously from 163 nm to 194 nm at peak powers of ~1 W corresponding to ~10$^7$ photons in a 20 psec pulse.

Pulse compression techniques may be employed to reduce the length of the pulses of beam 20 such as chirping and compression and optical phase conjugation through the use stimulated Brillouin scattering.

Figure 1B:
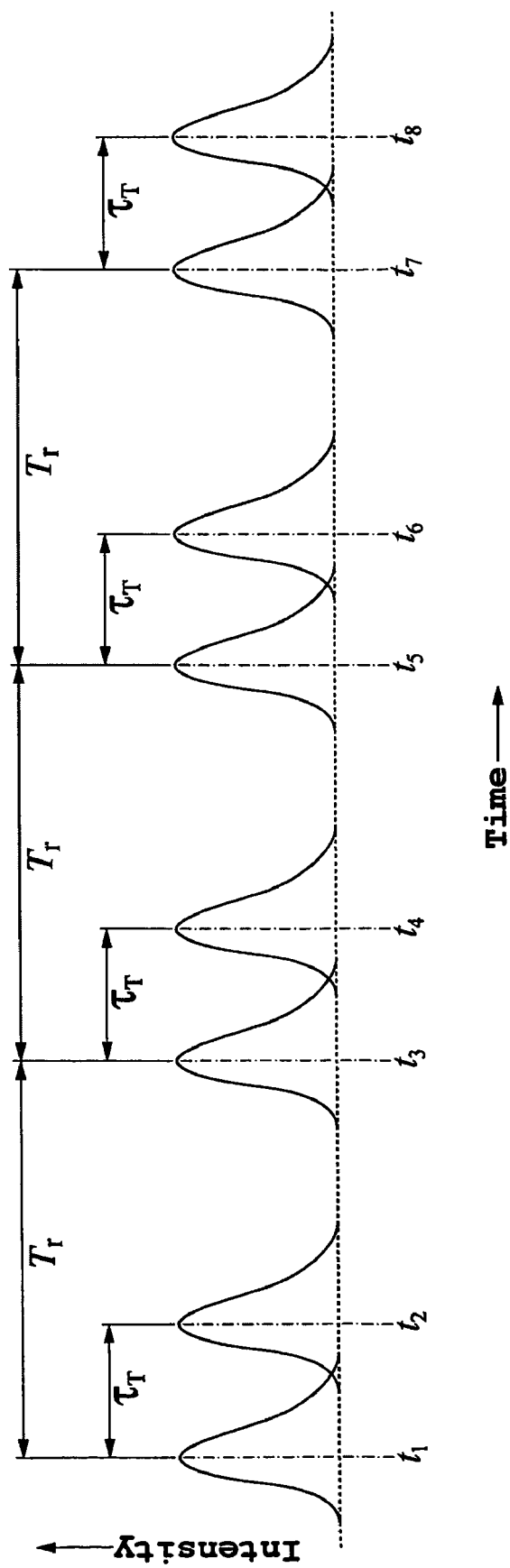
FIG. 1b is a graphical representation of 4 2-tuplet of pulses.
Figure 1C:
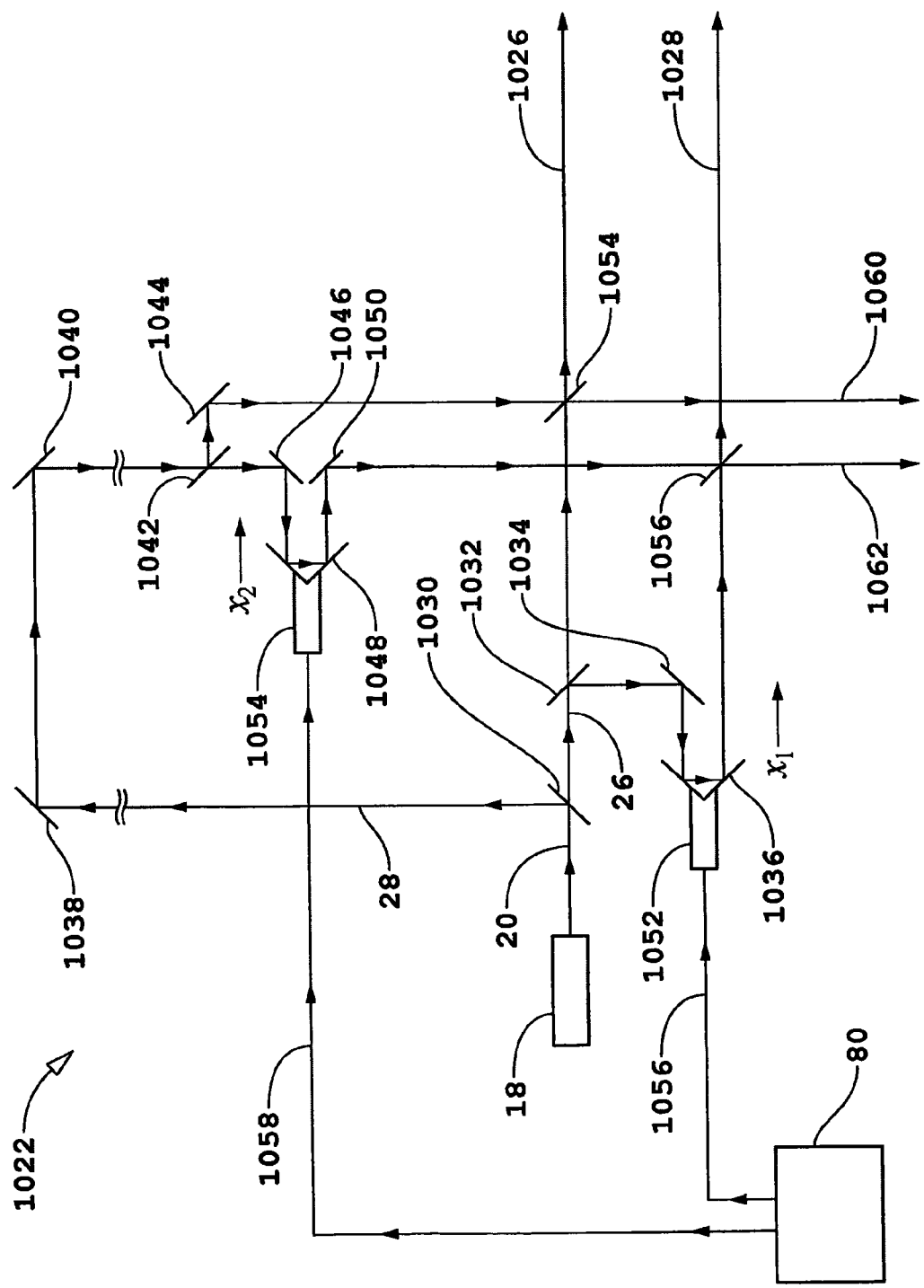
FIG. 1c is a diagrammatic representation of a beam-conditioner for generation of 2-tuplet of pulses.

The general description is continued with reference to FIG. 1c which shows schematically an embodiment 1022 of beam-conditioner 22 wherein beam-conditioner 1022 generates a 2-tuplet of pulses for each pulse from source 18, generates reference and measurement beam components for each pulse of the 2-tuplet of pulses, and introduces phase shifts between the different reference beams relative to corresponding measurement beams. Source 18 comprises a pulsed laser such as described herein and generates beam 20 as a plane polarized beam.

Beam-conditioner 1022 comprises a non-polarizing beam-splitters 1030, 1032, 1042, 1054 and 1056; mirrors 1034, 1038, 1040, 1044, 1046, and 1050; and retroreflectors 1036 and 1048. The positions of retroreflectors 1036 and 1048 are controlled by transducers 1052 and 1054, respectively, by signals 1056 and 1058, respectively, from electronic processor and controller 80. Beam 20 is incident on non-polarizing beam-splitter 1030 wherein a first portion thereof is transmitted as beam 26 and a second portion thereof is reflected as beam 28. A first portion of beam 26 is transmitted by beam-splitters 1032 and 1054 as a first component of reference beam 1026. A second portion of beam 26 is reflected by beam-splitter 1032, mirror 1034, and retroreflector 1036 and transmitted by beam-splitter 1056 as a first component of measurement beam 1028. A first portion of beam 28 is reflected by mirrors 1038, 1040, and 1044 and beam-splitters 1042 and 1054 as a second component of reference beam 1026. A second portion of beam 28 is reflected by mirrors 1038 and 1040; transmitted by beam-splitter 1042; reflected by mirrors 1046 and 1050 and retroreflector 1048; and reflected by beam-slitter 1056 as a second component of measurement beam 1028. Reference beam 1026 and measurement beam 1028 form spatial separated reference and measurement beams comprising 2-tuplet of pulses for each pulse from source 18.

A second set of reference and measurement beams are also generated as beams 1060 and 1062, respectively, that can be used as reference and measurement input beams for an interferometer system different from the interferometer system for which beams 1026 and 1028 are input reference and measurement beams, respectively. For the generation of the second set of reference and measurement beams, a third portion of beam 26 is transmitted by beam-splitter 1032 and reflected by beam-splitter 1054 as a first component of reference beam 1060. A fourth portion of beam 26 is reflected by beam-splitter 1032, mirror 1034, and retroreflector 1036 and reflected by beam-splitter 1056 as a first component of measurement beam 1062. A third portion of beam 28 is reflected by mirrors 1038, 1040, and 1044 and beam-splitter 1042 and transmitted by beam-splitter 1054 as a second component of reference beam 1060. A fourth portion of beam 28 is reflected by mirrors 1038 and 1040; transmitted by beam-splitter 1042; reflected by mirrors 1046 and 1050 and retroreflector 1048 and transmitted by beam-slitter 1056 as a second component of measurement beam 1062. Reference beam 1060 and measurement beam 1062 form the second set of spatially separated reference and measurement beams comprising 2-tuplet of pulses for each pulse from source 18.

Beam-splitters 1030, 1032, 1042, 1054, and 1056 may each be 50/50 non-polarizing beam-splitter or some other combination of transmission and reflection coefficients as required for an end use application. The amplitude of the respective $A_m C_m$ terms in measured electrical interference signals (see description of homodyne detection methods herein) exhibits a broad maximum as a function of transmission coefficient about a transmission coefficient of 50% for the non-polarizing beam-splitters.

The difference in optical path lengths experienced by the second components of beam 1026 and 1028 is selected so reference and measurement beams 1026 and 1028, respectively, each comprise a 2-tuplet of pulses for each pulse from source 18 and the first and second set of components of beams 1026 and 1028 are separated by time $\xi_T$ (see FIG. 1*b*).

Displacements $\chi_1$ and $\chi_2$ of retroreflectors 1036 and 1048, respectively, will introduced by transducers 1052 and 1054, respectively, will introduced relative a phase shift $\Delta\phi_1$ between the first measurement and first reference beam components of beams 1028 and 1026 and a relative phase shift $\Delta\phi_2$ between the second measurement and second reference beam components of beams 1028 and 1026. The relationship between displacements $\chi_1$ and $\chi_2$ and the phase shifts $\Delta\phi_1$ and $\Delta\phi_2$ are given by the following formulae:

$$\Delta\phi_1 = -2k\chi_1,$$

$$\Delta\phi_2 = -2k\chi_2, \qquad (19)$$

where k is the wavenumber for the pulse of source 18.

The phase shifts introduced by translation of retroreflectors 1036 and 1048 may alternatively be introduced by an electro-optical modulator inserted in the respective optical paths (not shown in a figure).

Reference and measurement beams 1026 and 1028 each with coextensive first and second components may be used as spatially separated input reference and measurement beam components or combined by a non-polarizing beam-splitter (not shown in FIG. 1*c*) to form an input beam with spatially coextensive components for embodiments of the present invention. When beam-conditioner 1022 is used for beam-conditioner 22 of FIG. 1*a*, reference and measurement beams 1026 and 1028 correspond to reference and measurement beam 24A and 24B, respectively, of FIG. 1*a*.

Figure 1D:
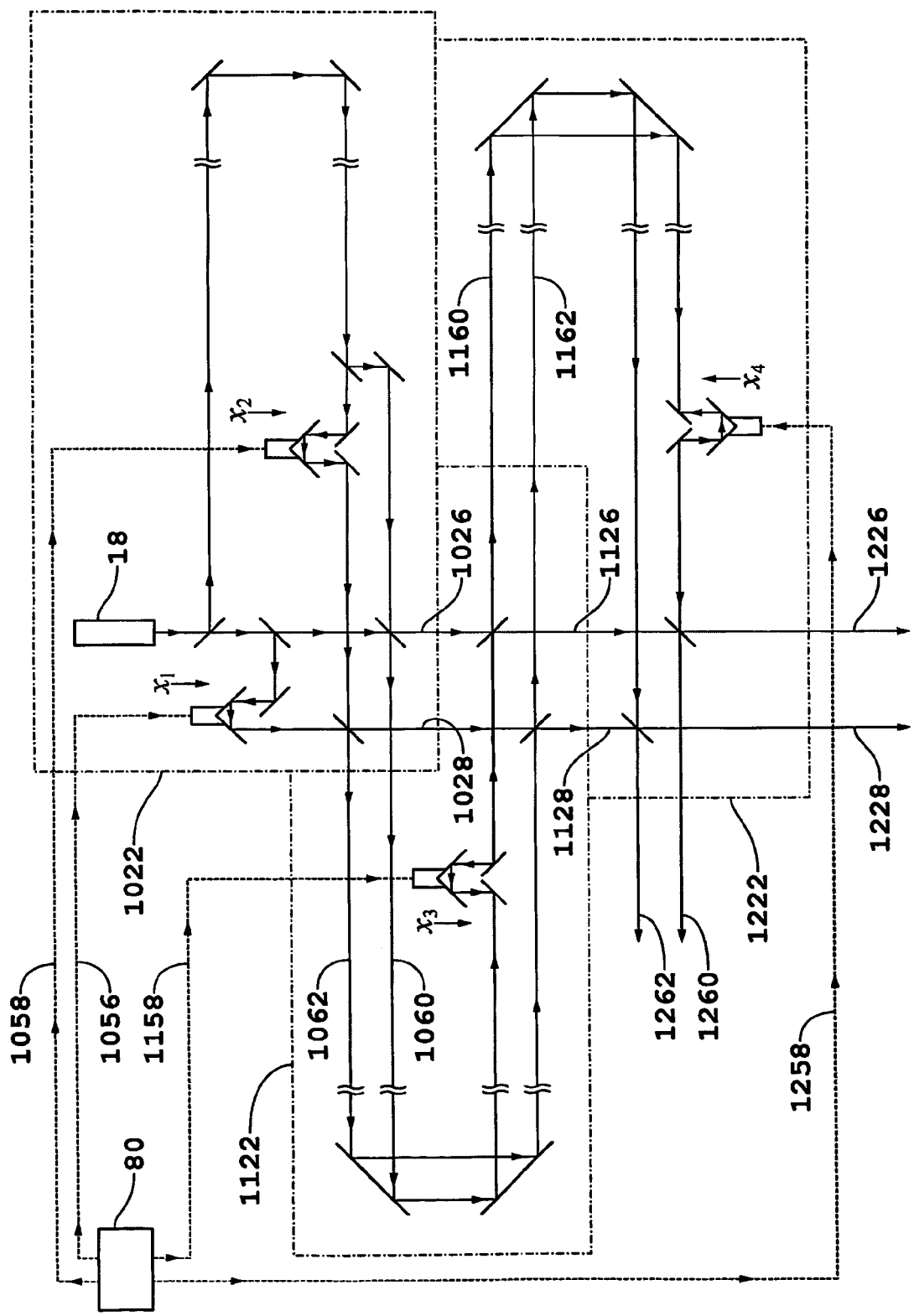
FIG. 1d is a diagrammatic representation of another beam-conditioner for generation of an N-tuplet of pulses where $N \geq 4$.

The generalization of source 18 and beam-conditioner 1022 to embodiments that generate an N-tuplet of pulses for each pulse from source 18 is shown schematically in FIG. 1*d*. The description of source 18 of FIG. 1*d* is the same as the description of source 18 in FIG. 1*c*. For generation of an N=4-tuplet of pulses, the respective beam-conditioner comprises beam-conditioner 1022 and beam-conditioners 1122. For generation of an N=8-tuplet of pulses corresponding to the beam-conditioner shown in FIG. 1*d*, the respective beam-conditioner comprises beam-conditioner 22, 1122, and 1222.

The descriptions of beam-conditioners 1122 and 1222 and signals 1158 and 1258 are the same as the corresponding portions of the description given for beam-conditioner 1022 and signal 1058 shown in FIG. 1*c* except with respect to the time delays introduced. The time delays introduced in beam-conditioners 1122 and 1222 are different and also different from the time delay introduced by beam-conditioner 1022 such that the condition with respect to generation of cross interference terms is met.

When beam-conditioners 1022 and 1122 are used for beam-conditioner 22 of FIG. 1*a*, reference and measurement beams 1126 and 1128 correspond to reference and measurement beam 24A and 24B, respectively, of FIG. 1*a*. When beam-conditioners 1022, 1122, and 1222 are used for beam-conditioner 22 of FIG. 1*a*, reference and measurement beams 1226 and 1228 correspond to reference and measurement beam 24A and 24B, respectively, of FIG. 1*a*.

The extension of procedure used to generate a beam-conditioner for some other value of N from the geometric series will be evident to someone skilled in the art without departing from the scope and spirit of the present invention.

An important feature or advantage of the beam-conditioner of the type shown in FIG. 1*d* is that the efficiency for the generation of the reference and measurement beams comprising N-tuplet of pulses for each pulse from source 18 with control of phase shifts between respective components of the reference and measurement beams is independent of the value of N.

The interferometric microscopy embodiments of the present invention are separated into groups according to properties of a measurement beam incident on an object or substrate; to whether the measurement and reference beams are combined at the substrate or at an independent beam combining element; and to properties of a reference beam incident on the beam combining element, e.g. a beam-splitter or the substrate. Certain of the embodiments comprise confocal imaging systems and certain other of the embodiments comprise non-confocal imaging systems.

The referenced properties of the reference and measurement beams are with respect to states of polarization, spatial properties of the beams, and the spatial properties relative to the states of polarization. The reference and measurement beams may comprise standing wave beams and/or non-standing wave beams. For a reference beam comprising a standing wave beam at a beam combining element, the referenced properties of the reference beam are with respect to a state of polarization of a standing wave beam, spatial properties of the standing wave beam, and the spatial properties relative to the state of polarization or the state of polarization relative to the direction of propagation of the reference beam. For a reference beam comprising a non-standing wave beam at a beam combining element, the referenced properties of the reference beam are with respect to a state of polarization of the reference beam relative to the plane of incidence at a beam combining element or the state of polarization relative to a coordinate system at the beam combining element.

The interferometer system shown diagrammatically in FIG. 1a is shown diagrammatically in FIGS. 2a–2f for different interferometer types and different reference and measurement beam paths in the interferometer system. In FIGS. 2a–2f, substrate 60 is translated by stage 90 wherein substrate 60 is mounted on wafer chuck 84 with wafer chuck 84 mounted on stage 90. The position of stage 90 is controlled by transducer 82 according to servo control signal 78 from electronic processor and controller 80. The position of stage 90 is measured by metrology system 88 and position information acquired by metrology system 88 is transmitted as signal 76 to electronic processor and controller 80 to generate an error signal for use in the position control of stage 90. Metrology system 88 may comprise for example linear displacement and angular displacement interferometers and cap gauges. The elevation and angular orientation of substrate 60 is controlled by transducers 86A and 86B according to servo control signal 78.

Also shown in FIGS. 2a–2f are servo control signal 98 from servo controller 96 and error signal 94 from electronic processor and controller 80. The servo control signal 98 may be used to control in interferometer 10 for example the phases introduced by one or more phase shifters and/or the locations and orientations of adaptive reflecting surfaces that are controlled by transducers such as described in commonly owned U.S. Provisional Patent Application No. 60/506,715 (ZI-56) and U.S. patent application Ser. No. 10/948,959 (ZI-56) wherein both are entitled "Catoptric and Catadioptric Imaging Systems Comprising Pellicle Beam-Splitters And Non-Adaptive And Adaptive Catoptric Surfaces" and both are by H. A. Hill, D. Fischer, and S. Hamann. The contents of both the U.S. Provisional Patent Application and the U.S. Patent Application are included here within in their entirety by reference.

Figure 2A:
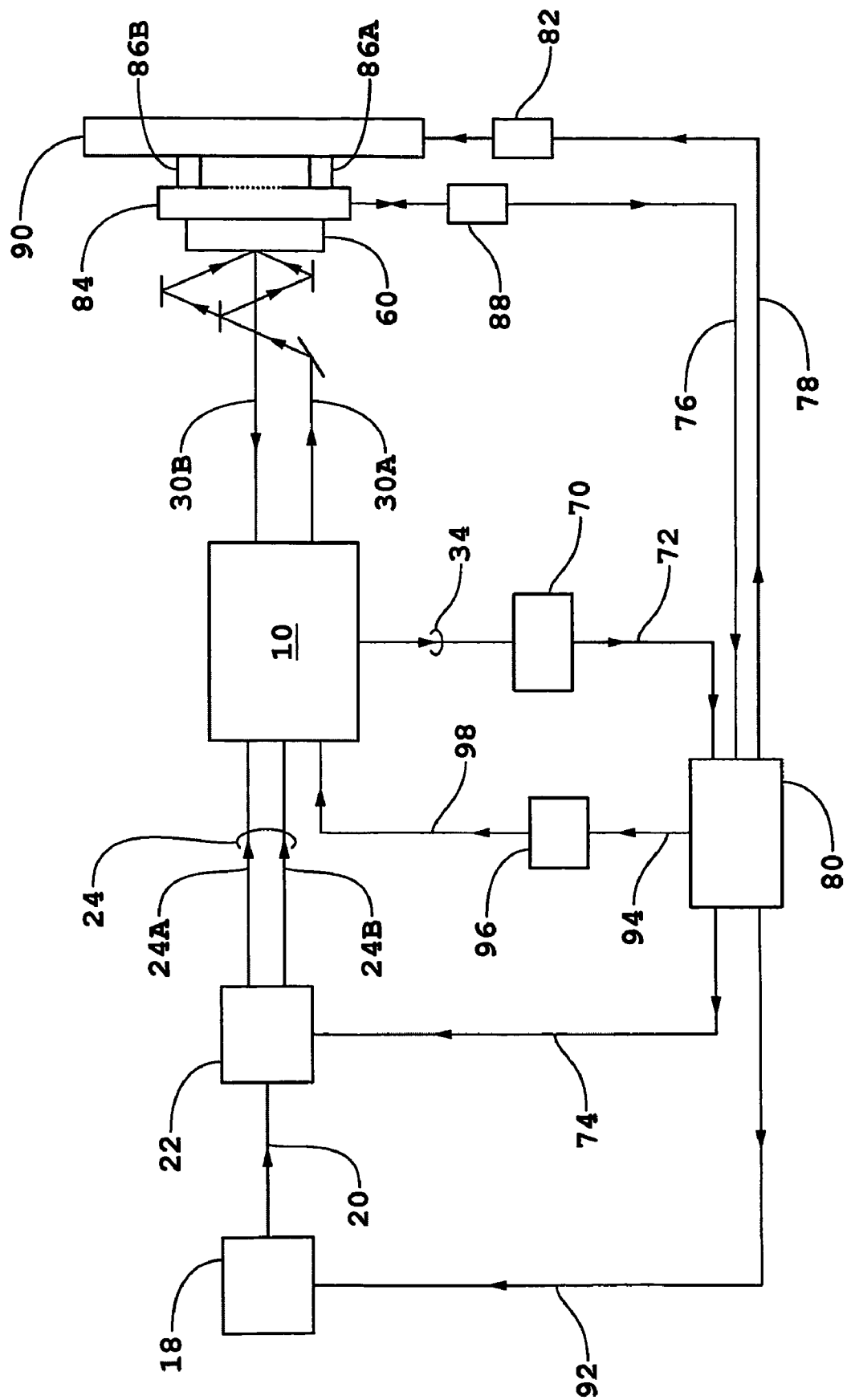
FIG. 2a is a schematic diagram of a non-confocal interferometer system is operating in a reflection mode with a measurement beam comprising a standing wave beam at measurement object.

Referring to FIG. 2a, a non-confocal interferometer system is shown diagrammatically as in interferometer system operating in a reflection mode to measure conjugate quadratures of fields reflected/scattered by substrate 60 with a measurement beam comprising a standing wave beam at substrate 60. The interferometer system shown diagrammatically in FIG. 2a comprises interferometer 10, source 18, beam-conditioner 22, detector 70, electronic processor and controller 80, and measurement object shown as substrate 60. Source 18 generates input beam 20.

The standing wave measurement beam is generated from measurement beam 30A by a combination of a beam-splitter and two mirrors as shown diagrammatically in FIG. 2a. Measurement beam 30A is generated directly from measurement beam component 24B. Reference beam 30C component generated directly from measurement beam component 24A is incident on a beam combining element in interferometer 10 and may be a standing wave beam such as described for the measurement beam or a non-standing wave beam.

Figure 2B:
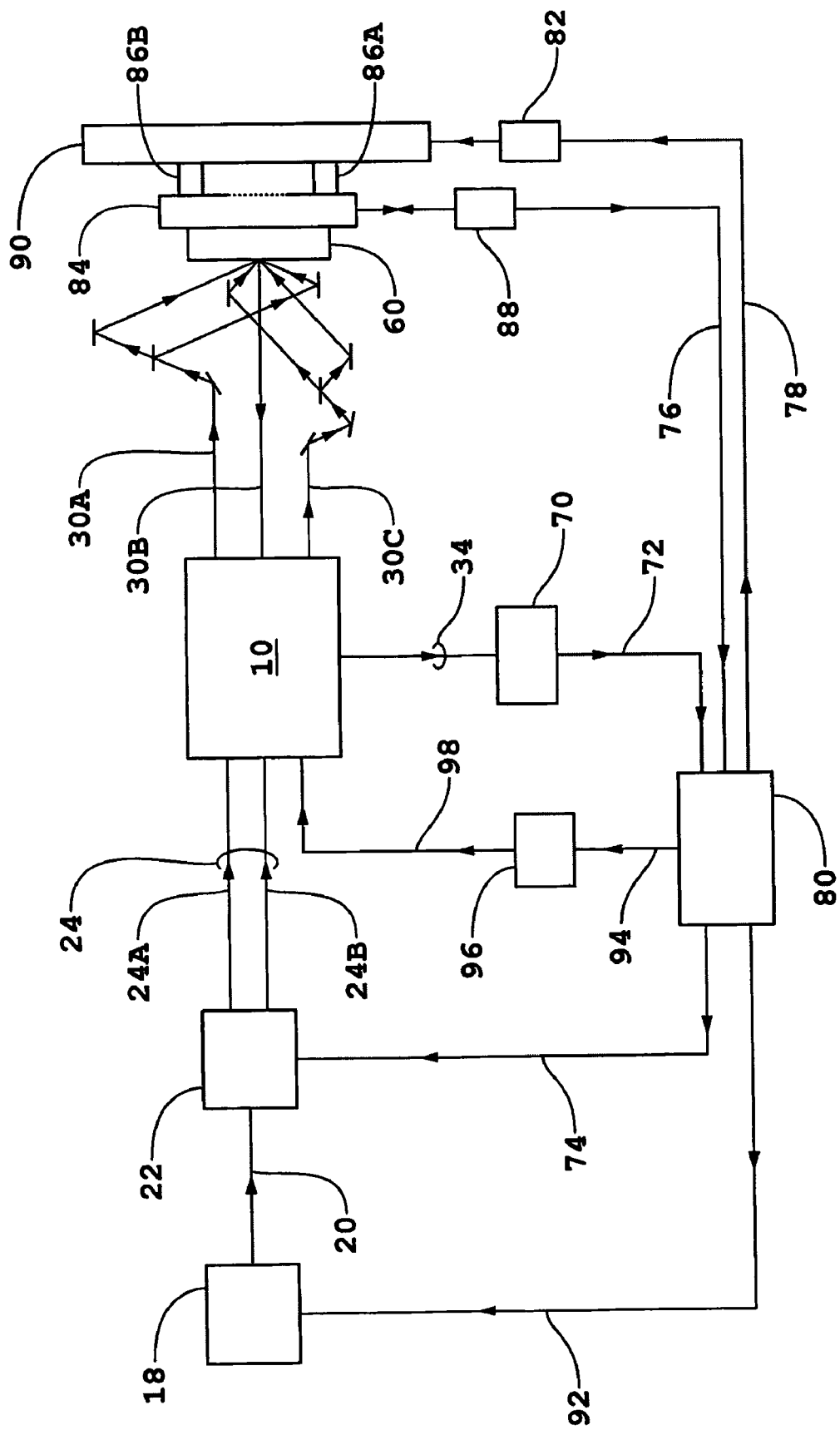
FIG. 2b is a schematic diagram of a non-confocal interferometer system is operating in a reflection mode with the measurement beam and the reference beam comprising standing wave beams at measurement object.

The non-confocal interferometer system shown diagrammatically in FIG. 2b represents an interferometric imaging system operating in a reflecting mode to measure conjugated quadratures of fields reflected/scattered by substrate 60 for embodiments of the present invention wherein the measurement object is also used as the element to combine a standing wave measurement beam and a standing wave reference beam to form a coextensive beam at the measurement object. Referring to FIG. 2b, the non-confocal interferometer system is shown diagrammatically comprising an imaging system 10, source 18, beam-conditioner 22, detector 70, electronic processor and controller 80, and measurement object shown as substrate 60. Measurement beam 30A is generated directly from measurement beam component 24B and reference beam 30C component is generated directly from reference beam component 24A In the non-confocal interferometer system shown in FIG. 2b, both the measurement beam and the reference beam comprise standing wave beams at substrate 60. The plane of the two measurement beams forming the standing wave measurement beam at substrate 60 and the plane of the two reference beams forming the standing wave reference beam at substrate 60 are both shown as lying in the plane of FIG. 2b in order to simplify the diagram for illustration purposes only. In practice, the two planes will generally be at some angle with respect to each other, e.g. 90 degrees.

Figure 2C:
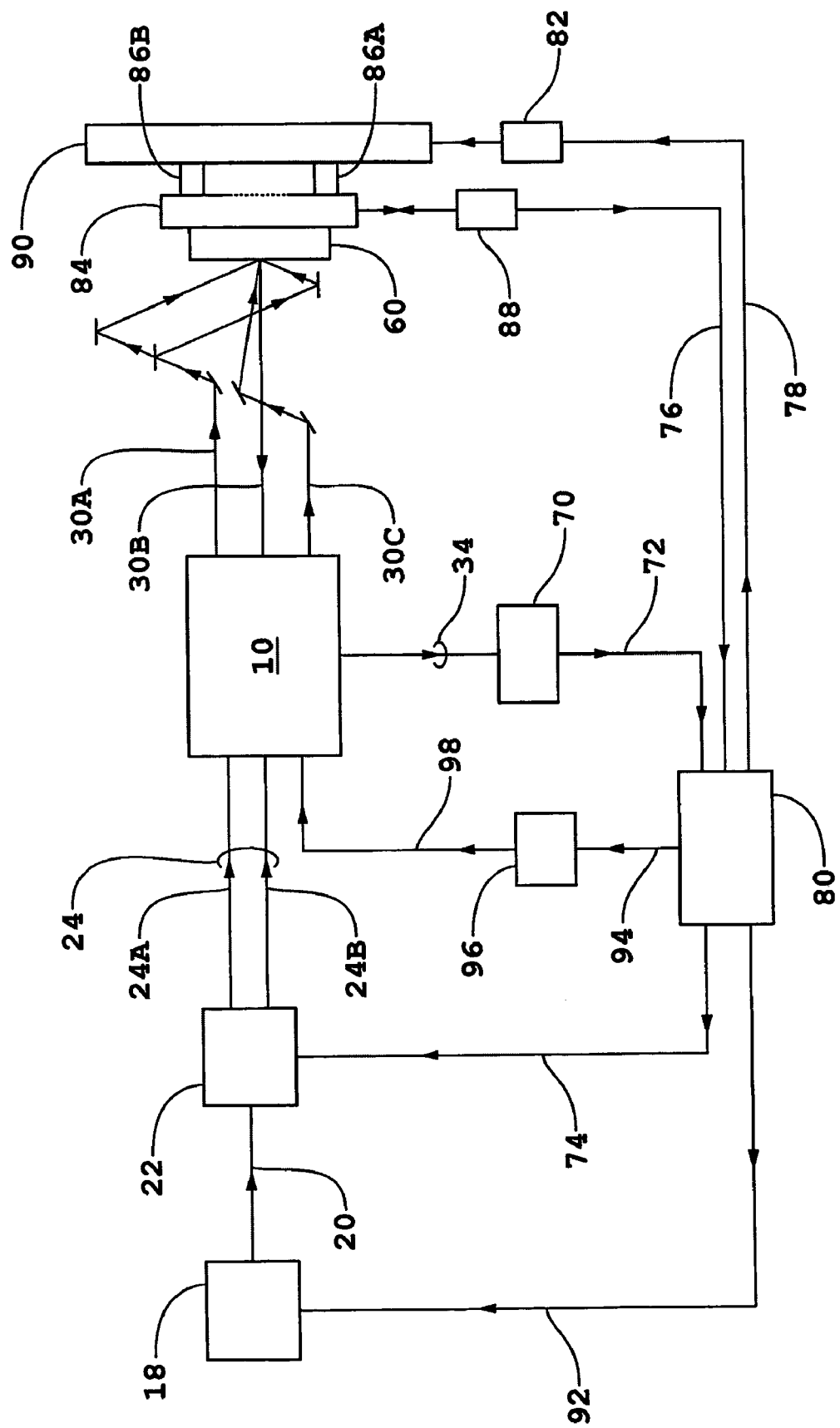
FIG. 2c is a schematic diagram of a of a non-confocal interferometer system is operating in a reflection mode wherein the measurement object is also used as the element to combine a standing wave measurement beam and a non-standing wave reference beam.

The non-confocal interferometer system shown diagrammatically in FIG. 2c represents an interferometric imaging system operating in a reflecting mode to measure conjugated quadratures of fields reflected/scattered by substrate 60 for embodiments of the present invention wherein the measurement object is also used as the element to combine a standing wave measurement beam and a non-standing wave reference beam to form a coextensive beam at the measurement object. Referring to FIG. 2c, the non-confocal interferometer system is shown diagrammatically comprising an imaging system 10, source 18, beam-conditioner 22, detector 70, electronic processor and controller 80, and measurement object shown as substrate 60. Measurement beam 30A is generated directly from measurement beam component 24B and reference beam 30C component is generated directly from reference beam component 24A In the non-confocal interferometer system shown in FIG. 2c, the measurement beam comprises a standing wave beam at substrate 60. The reference beam is shown as lying in the plane of FIG. 2c with a non-zero angle of incidence in order to simplify the diagram for illustration purposes only. In practice, the direction of propagation of the reference beam may lie in different plane and the angle of incidence may be zero.

Figure 2D:
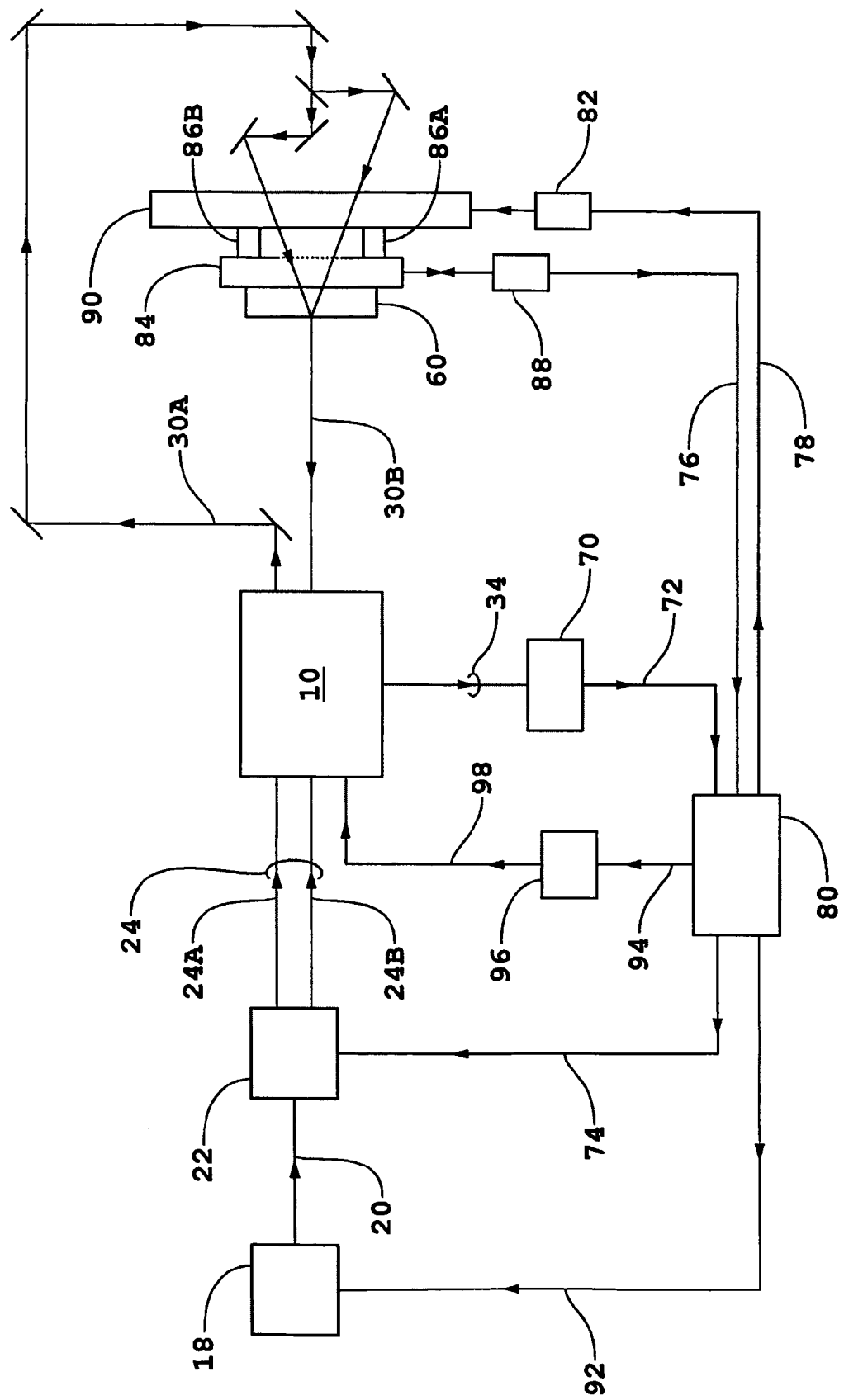
FIG. 2d is a schematic diagram of a non-confocal interferometer system is operating in a transmission mode wherein the measurement beam comprises a standing wave beam at measurement object.

The non-confocal interferometer system shown diagrammatically in FIG. 2d represents an interferometer imaging system operating in the transmission mode to measure the conjugated components of fields transmitted by substrate 60 and further represents embodiments of the present invention wherein the measurement beam comprises a standing wave beam at substrate 60. Measurement beam 30A is generated directly from measurement beam component 24B.

Figure 2E:
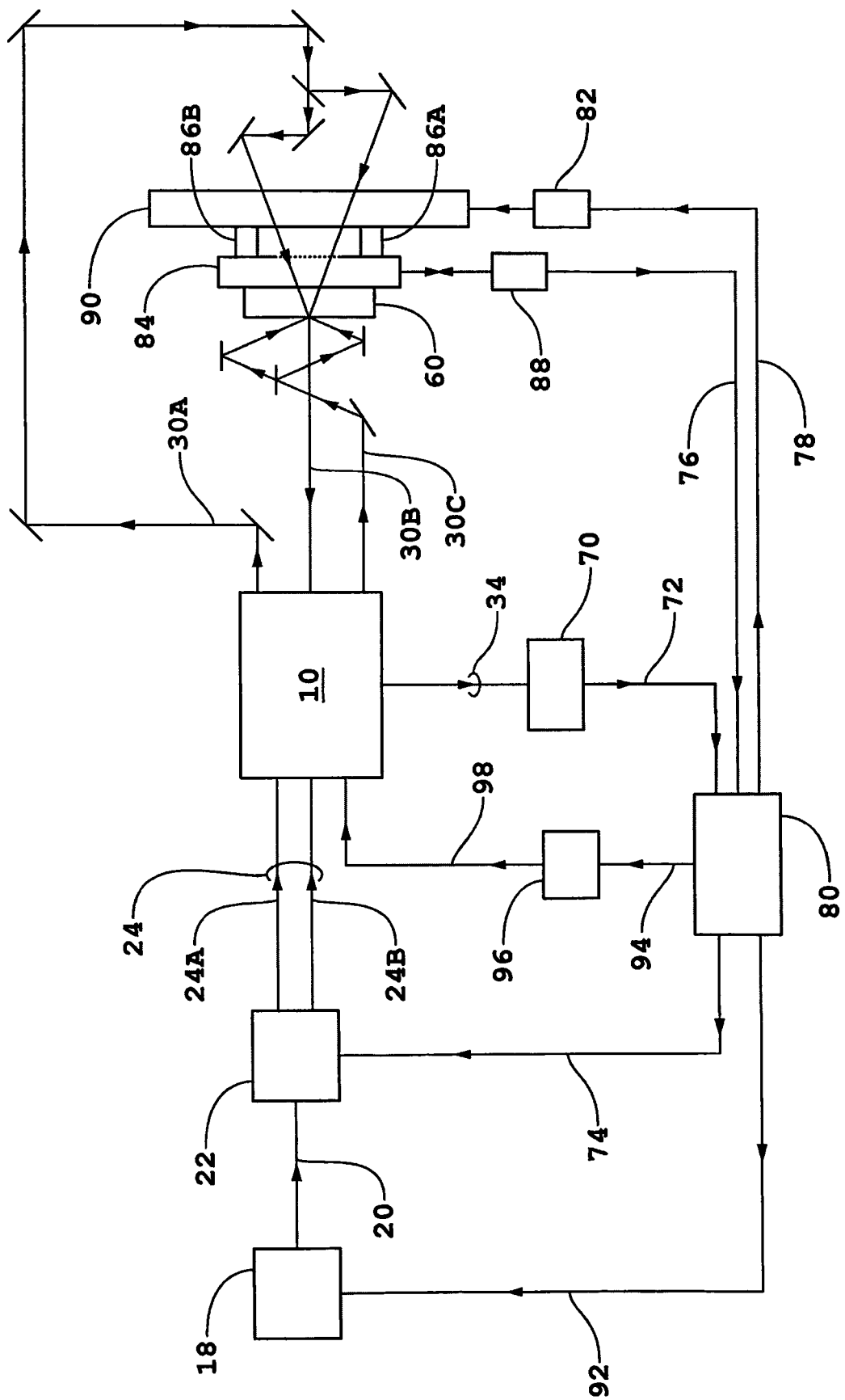
FIG. 2e is a schematic diagram of a non-confocal interferometer system is operating in a transmission mode wherein the measurement object is also used as the element to combine a standing wave measurement beam and a standing wave reference beam.

The non-confocal interferometer system shown diagrammatically in FIG. 2e represents an interferometric imaging system operating in a transmission mode to measure conjugated quadratures of fields transmitted by substrate 60 for embodiments of the present invention wherein the measurement object is also used as the element to combine a standing wave measurement beam and a standing wave reference beam to form a coextensive beam at substrate 60. Referring to FIG. 2e, the non-confocal interferometer system is shown diagrammatically comprising an imaging system 10, source 18, beam-conditioner 22, detector 70, electronic processor and controller 80, and measurement object shown as substrate 60. Measurement beam 30A is generated directly from measurement beam component 24B and reference beam 30C component is generated directly from reference beam component 24A In the non-confocal interferometer system shown in FIG. 2e, both the measurement beam and the reference beam comprise standing wave beams at substrate 60. The plane of the two measurement beams forming the standing wave measurement beam at substrate 60 and the plane of the two reference beams forming the standing wave reference beam at substrate 60 are both shown as lying in the plane of FIG. 2e in order to simplify the diagram for illustration purposes only. In practice, the two planes will generally be at some angle with respect to each other, e.g. 90 degrees.

Figure 2F:
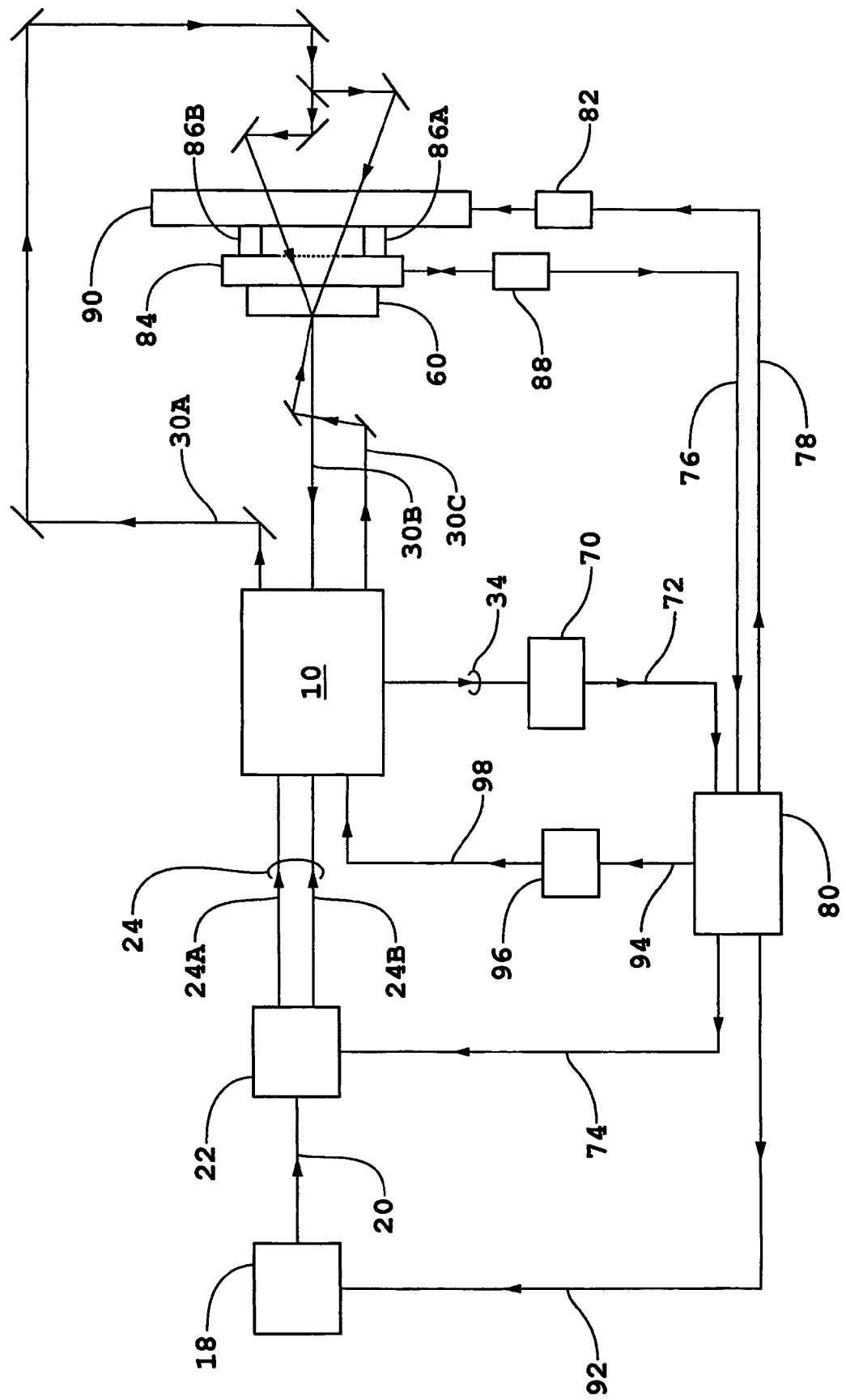
FIG. 2f is a schematic diagram of a non-confocal interferometer system is operating in a transmission mode wherein the measurement object is also used as the element to combine a standing wave measurement beam and a non-standing wave reference beam.

The non-confocal interferometer system shown diagrammatically in FIG. 2f represents an interferometric imaging system operating in a transmission mode to measure conjugated quadratures of fields transmitted by substrate 60 for embodiments of the present invention wherein the measurement object is also used as the element to combine a standing wave measurement beam and a non-standing wave reference beam to form a coextensive beam at the measurement object. Referring to FIG. 2f, the non-confocal interferometer system is shown diagrammatically comprising an imaging system 10, source 18, beam-conditioner 22, detector 70, electronic processor and controller 80, and measurement object shown as substrate 60. Measurement beam 30A is generated directly from measurement beam component 24B and reference beam 30C component is generated directly from reference beam component 24A Several embodiments of the present invention are described that comprise interferometric confocal and non-confocal far field microscopy systems and a linear displacement interferometer, e.g. such as used in wavelength monitors, refractivity of gas monitors, monitors of the reciprocal dispersive power Γ of a gas, and dispersion interferometry.

Figure 3A:
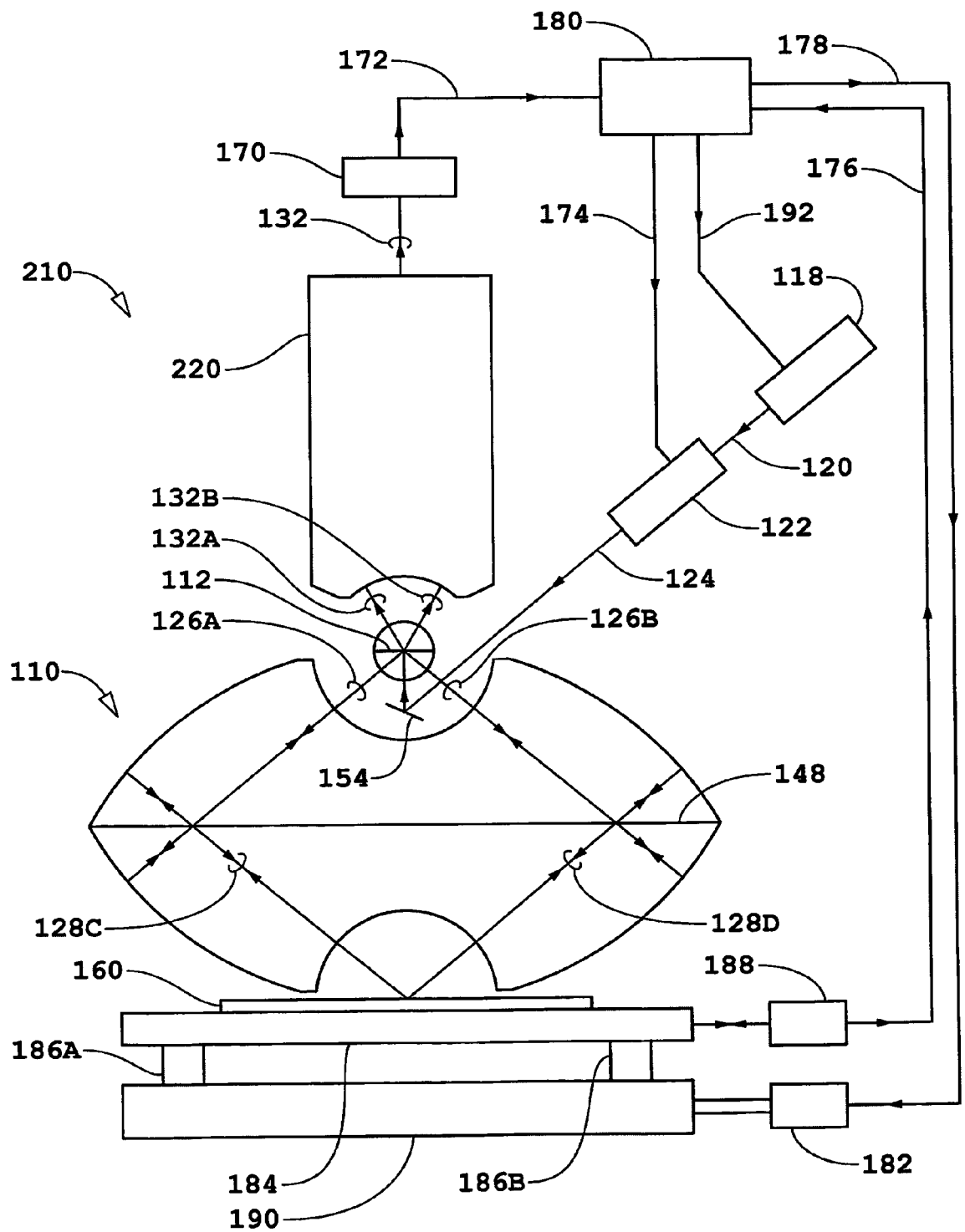
FIG. 3a is a schematic diagram of an interferometric confocal microscope system.

A first embodiment of the present invention is shown schematically in FIG. 3a. The first embodiment comprises a first imaging system generally indicated as numeral 110, pinhole beam-splitter 112, detector 170, and a second imaging system generally indicated as numeral 210. The second imaging system 210 is low power microscope having a large working distance, e.g. Nikon ELWD and SLWD objectives and Olympus LWD, ULWD, and ELWD objectives. The first imaging system 110 comprises the interferometric confocal microscopy system described in commonly owned U.S. Provisional Application No. 60/442,982 (ZI-45) and U.S. patent application Ser. No. 10/765,229 (ZI-45) wherein both are entitled "Interferometric Confocal Microscopy Incorporating Pinhole Array Beam-Splitter" and both are by Henry A. Hill. The contents of both are here within incorporated in their entirety by reference.

Figure 3B:
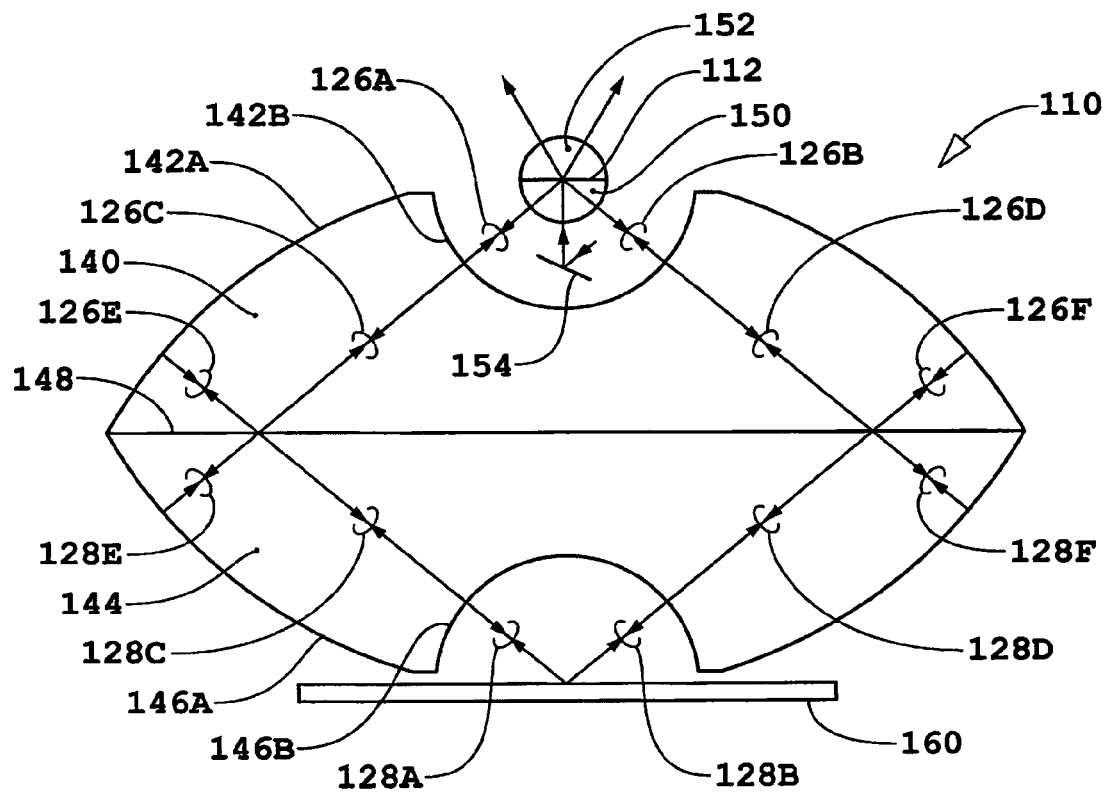
FIG. 3b is a schematic diagram of catadioptric imaging system.

The first imaging system 110 is shown schematically in FIG. 3b. The imaging system 110 is a catadioptric system such as described in commonly owned U.S. Pat. No. 6,552,852 B1 (ZI-38) entitled "Catoptric and Catadioptric Imaging System" and U.S. Pat. No. 6,717,736 (ZI-43) entitled "Catoptric and Catadioptric Imaging System" for which the patents are by Henry A. Hill and the contents of the patents are incorporated herein in their entirety by reference.

A number of different catadioptric imaging systems and applications of catadioptric imaging systems for far-field, evanescent field, and near-field interferometric confocal and non-confocal microscopy have also been described such as in commonly owned U.S. Provisional Patent Applications No. 60/447,254 (ZI-40) entitled "Transverse Differential Interferometric Confocal Microscopy," No. 60/448,360 (ZI-41) entitled "Longitudinal Differential Interferometric Confocal Microscopy," No. 60/448,250 (ZI-42) entitled "Thin Film Metrology Using Interferometric Confocal Microscopy," No. 60/459,425 (ZI-50), No. 60/485,255 (ZI-53) entitled "Apparatus and Method for Ellipsometric Measurements with High Spatial Resolution," No. 60/507,675 (ZI-55) entitled "Method And Apparatus For Enhanced Resolution of High Spatial Frequency Components Of Images Using Standing Wave Beams In Non-Interferometric and Interferometric Microscopy," and No. 60/571,967 (ZI-63) entitled "Apparatus And Methods For Measurement Of Critical Dimensions Of Features And Detection Of Defects In UV, VUV, And EUV Lithography Masks"; and in U.S. patent application Ser. No. 10/778,371 (ZI-40) entitled "Transverse Differential Interferometric Confocal Microscopy," Ser. No. 10/782,057 (ZI-41) entitled "Longitudinal Differential Interferometric Confocal Microscopy," Ser. No. 10/782,058 (ZI-42) entitled "Thin Film Metrology Using Interferometric Confocal Microscopy," Ser. No. 10/816,180 (ZI-50), and Ser. No. 10/886,157 (ZI-53) entitled "Apparatus and Method for Ellipsometric Measurements with High Spatial Resolution," and Ser. No. 10/954,625 (ZI-55) entitled "Method And Apparatus For Enhanced Resolution of High Spatial Frequency Components of Images using Standing Wave Beams in Non-Interferometric and Interferometric Microscopy," and U.S. Patent Application filed May 6, 2005 (ZI-63) entitled "Apparatus And Methods For Measurement Of Critical Dimensions Of Features And Detection Of Defects In UV, VUV, And EUV Lithography Masks." The seven patent applications, and the seven provisional patent applications are all by Henry A. Hill and the contents of each of which are incorporated herein in their entirety by reference. Other different catadioptric imaging systems and applications of catadioptric imaging systems for far-field, evanescent field, and near-field interferometric confocal and non-confocal microscopy have also been described in cited U.S. Provisional Patent Applications No. 60/442,982 (ZI-45), No. 60/501,666 (ZI-54), and No. 60/506,715 (ZI-56) and in cited U.S. patent application Ser. No. 10/765,229 (ZI-45), Ser. No. 10/938,408 (ZI-54), and Ser. No. 10/948,959 (ZI-56).

Catadioptric imaging systems described in the cited commonly owned U.S. Patent and Provisional Patent Applications with respect to different catadioptric imaging systems and applications of catadioptric imaging systems for far-field, evanescent field, and near-field interferometric confocal and non-confocal microscopy may be incorporated in interferometer 10 without departing from the scope or spirit of the present invention. The measurement beams incident on substrate 60 are evanescent beams when the angle of incidence of a measurement beam at a surface of an element of interferometer 10 that is adjacent to substrate 60 is greater than that required to produce total internal reflection and the separation of the surface of the element and the adjacent surface of substrate 60 is $\leq \lambda/4$ such as described in cited U.S. Provisional Patent Applications No. 60/485,507 (ZI-52) and No. 60/506,715 (ZI-56) and U.S. patent application Ser. No. 10/866,010 (ZI-52) and Ser. No. 10/948,959 (ZI-56). The measurement beams at substrate 60 may also be in the form of near-fields when an array of transmitting sub-wavelength apertures is located on the surface of interferometer 10 and the separation of the surface of the element and the adjacent surface of substrate 60 is $\leq \lambda/4$ such as described in cited U.S. Pat. No. 6,445,453 (ZI-14).

Catadioptric imaging system 110 comprises catadioptric elements 140 and 144, beam splitter 148, and convex lens 150. Surfaces 142A and 146A are convex spherical surfaces with nominally the same radii of curvature and the respective centers of curvature of surfaces 142A and 146A are conjugate points with respect to beam splitter 148. Surfaces 142B and 146B are concave spherical surfaces with nominally the same radii of curvature. The centers of curvature of surfaces 142B and 146B are the same as the centers of curvature of surfaces 146A and 142A, respectively. The center of curvature of convex lens 150 is the same as the center of curvature of surfaces 142B and 146A. The radius of curvature of surface 146B is selected so as to minimize the loss in efficiency of the imaging system 110 and to produce a working distance for imaging system 110 acceptable for an end use application. The radius of curvature of convex lens 150 is selected so that the off-axis aberrations of the catadioptric imaging system 110 are compensated. The medium of elements 140 and 144 may be for example fused silica or commercially available glass such as SF11. The medium of convex lens 150 may be for example fused silica, YAG, or commercially available glass such as SF11. An important consideration in the selection of the medium of elements 140 and 144 and convex lens 150 will the transmission properties for the frequencies of beam 124.

Figure 3C:
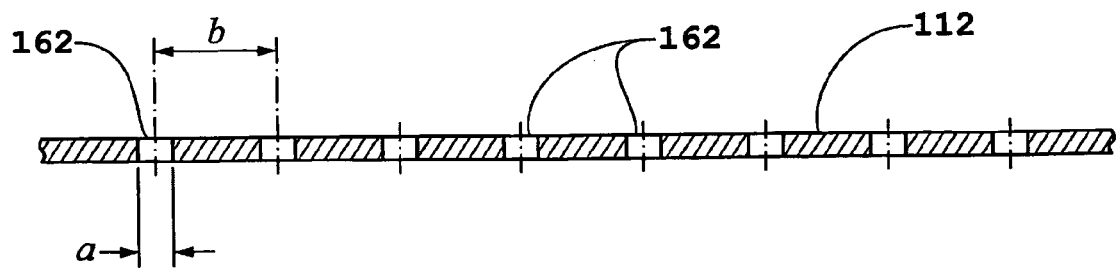
FIG. 3c is a schematic diagram of a pinhole array used in a confocal microscope system.

Convex lens 152 has a center of curvature the same as the center of curvature of convex lens 150. Convex lenses 150 and 152 are bonded together with pinhole beam-splitter 112 in between. Pinhole array beam-splitter 112 is shown in FIG. 3c. The pattern of pinholes in pinhole array beam-splitter is chosen to match the requirements of an end use application. An example of a pattern is a two dimensional array of equally spaced pinholes in two orthogonal directions. The pinholes may comprise circular apertures, rectangular apertures, or combinations thereof such as described in commonly owned U.S. patent application Ser. No. 09/917,402 (ZI-15) entitled "Multiple-Source Arrays for Confocal and Near-field Microscopy" by Henry A. Hill and Kyle Ferrio. The contents of the cited patent application are incorporated herein in its entirety by reference. The spacing between pinholes of pinhole array beam-splitter 112 is shown in FIG. 3c as b with aperture size a.

Input beam 124 is reflected by mirror 154 to pinhole beam-splitter 112 where a first portion thereof is transmitted as reference beam components of output beam 130A and 130B and a second portion thereof scattered as measurement beam components of beams 126A and 126B. The measurement beam components 126A and 126B are imaged as components of beams 128A and 128B to an array of image spots in an image plane close to substrate 160. A portion of the components of beams 128A and 128B incident on substrate 160 are reflected and/or scattered as return measurement beam components of beams 128A and 128B. Return measurement beam components of beams 128A and 128B are imaged by catadioptric imaging system 110 to spots that are coincident with the pinholes of pinhole beam-splitter 112 and a portion thereof is transmitted as return measurement beam components of output beams 130A and 130B.

The description of the imaging properties of catadioptric imaging system 110 is the same as the corresponding portion of the description given for the imaging properties of catadioptric imaging system 10 in cited U.S. Provisional Application No. 60/442,982 (ZI-45) and U.S. patent application Ser. No. 10/765,229 (ZI-45).

The next step is the imaging of output beams 130A and 130B by imaging system 210 to an array of spots that coincide with the pixels of a multipixel detector such as a CCD to generate an array of electrical interference signals 172. The array of electrical interference signals is transmitted to signal processor and controller 180 for subsequent processing.

The description of input beam 124 is the same as corresponding portions of the description given for input beam components 24A and 24B of FIG. 1a with beam-conditioner 122 configured the same as beam-conditioner 22 shown in FIG. 1c. The conjugated quadratures of fields of the return measurement beams are obtained using the homodyne detection as described with respect to the description of FIGS. 1b and 1c wherein sets of four measurements of the electrical interference signals 172 are made. For each of the set of four measurements of the electrical interference signals 172, a known sequence of phase shifts is introduced between the reference beam component and the return measurement beam component of output beams 130A and 130B.

The sequence of phase shifts is generated in the first embodiment by shifting the relative phases of components of input beam 124 by beam-conditioner 122.

Two different modes are described for the acquisition of the electrical interference signals 172. The first mode to be described is a step and stare mode wherein substrate 160 is stepped between fixed locations corresponding to locations where image information is desired. The second mode is a scanning mode. In the step and stare mode for generating a one-dimensional, a two-dimensional or a three-dimensional profile of substrate 160, substrate 160 mounted in wafer chuck 184/stage 190 is translated by stage 190. The position of stage 190 is controlled by transducer 182 according to servo control signal 178 from electronic processor and controller 180. The position of stage 190 is measured by metrology system 188 and position information acquired by metrology system 188 is transmitted to electronic processor and controller 180 to generate an error signal for use in the position control of stage 190. Metrology system 188 may comprise for example linear displacement and angular displacement interferometers and cap gauges.

Electronic processor and controller 180 translates wafer stage 190 to a desired position and then acquires a set of four electrical interference signal values. After the acquisition of the sequence of four electrical interference signals, electronic processor and controller 180 then repeats the procedure for the next desired position of stage 190. The elevation and angular orientation of substrate 160 is controlled by transducers 186A and 186B.

The second mode for the acquisition of the electrical interference signal values is next described wherein the electrical interference signal values are obtained with the position of stage 190 scanned in one or more directions. In the scanning mode, source 118 is pulsed at times controlled by signal 192 from signal processor and controller 180. Source 118 is pulsed at times corresponding to the registration of the conjugate image of pinholes of pinhole array beam-splitter 112 with positions on and/or in substrate 160 for which image information is desired.

There will be a restriction on the duration or "pulse width" of a beam pulse sequence $t_{p1}$ produced by source 120 as a result of the continuous scanning mode used in the third variant of the first embodiment. Pulse width $t_{p1}$ will be a parameter that in part controls the limiting value for spatial resolution in the direction of a scan to a lower bound of $$\xi_{p1} v, \tag{20}$$

where v is the scan speed. For example, with a value of $\xi_{p1}$=50 nsec and a scan speed of v=0.20 m/sec, the limiting value of the spatial resolution $\xi_{p1}$v in the direction of scan will be $$\xi_{p1} v = 10 \text{ nm}. \tag{21}$$

In the first mode for the acquisition of the electrical interference signals 172, the set of four electrical interference signals corresponding to a set of four electrical interference values are generated by common pixels of detector 170. In the second mode for the acquisition of electrical interference signals 172, a set of four electrical interference signal values are not generated by a common pixel of detector 170. Thus in the second mode of acquisition, the differences in pixel efficiency and the differences in sizes of pinholes in pinhole array beam-splitter 112 are compensated in the signal processing by signal processor and controller 180 as described in the description of the homodyne detection method with respect to FIGS. 1b and 1c. The joint measurements of conjugated quadratures of fields are generated by electric processor and controller 180 as previously described in the description of the homodyne detection method.

A second embodiment of the present invention comprises the interferometer system of FIGS. 1a–1d with interferometer 10 comprising an interferometric far-field confocal microscope such as described in cited U.S. Pat. No. 5,760,901 (ZI-05). In the second embodiment, beam-conditioner 22 is configured as shown in FIG. 1c. Embodiments in cited U.S. Pat. No. 5,760,901 (ZI-05) are configured to operate in either the reflection or transmission mode. The second embodiment has reduced effects of background because of background reduction features of cited U.S. Pat. No. 5,760,901 (ZI-05).

A third embodiment of the present invention comprises the interferometer system of FIGS. 1a–1d with interferometer 10 comprising an interferometric far-field confocal microscope such as described in cited U.S. Pat. No. 5,760,901 (ZI-05) wherein the phase masks are removed. In the third embodiment, beam-conditioner 22 is configured as shown in FIG. 1c. Embodiments in cited U.S. Pat. No. 5,760,901 (ZI-05) are configured to operate in either the reflection or transmission mode. The third embodiment with the phase masks of embodiments of cited U.S. Pat. No. 5,760,901 (ZI-05) removed represent applications of confocal techniques in a basic form.

A fourth embodiment of the present invention comprises the interferometer system of FIGS. 1a–1d with interferometer 10 comprising an interferometric far-field confocal microscope such as described in cited U.S. Pat. No. 6,480,285 B1 (ZI-08). In the fourth embodiment, beam-conditioner 22 is configured as shown in FIG. 1b. Embodiments in cited U.S. Pat. No. 6,480,285 B1 (ZI-08) are configured to operate in either the reflection or transmission mode. The fourth embodiment has reduced effects of background because of background reduction features of cited U.S. Pat. No. 6,480,285 B1 (ZI-08).

A fifth embodiment of the present invention comprises the interferometer system of FIGS. 1a–1d with interferometer 10 comprising an interferometric far-field confocal microscope such as described in cited U.S. Pat. No. 6,480,285 B1 (ZI-08) wherein the phase masks are removed. In the fifth embodiment, beam-conditioner 22 is configured as shown in FIG. 1c. Embodiments in cited U.S. Pat. No. 6,480,285 B1 (ZI-08) are configured to operate in either the reflection or transmission mode. The fifth embodiment with the phase masks of embodiments of cited U.S. Pat. No. 6,480,285 B1 (ZI-08) removed represent applications of confocal techniques in a basic form.

A sixth embodiment of the present invention comprises the interferometer system of FIGS. 1a–1d with interferometer 10 comprising an interferometric near-field confocal microscope such as described in U.S. Pat. No. 6,445,453 (ZI-14) entitled "Scanning Interferometric Near-Field Confocal Microscopy" by Henry A. Hill, the contents of which are herein incorporated in their entirety by reference. In the sixth embodiment, beam-conditioner 22 is configured shown in FIG. 1c. Embodiments in cited U.S. Pat. No. 6,445,453 (ZI-14) are configured to operate in either the reflection or transmission mode. The sixth embodiment of cited U.S. Pat. No. 6,445,453 (ZI-14) in particular is configured to operate in the transmission mode with the measurement beam separated from the reference beam and incident on the substrate being imaged by a non-confocal imaging system, i.e. the measurement beam at the substrate is not an image of an array of pinholes but an extended spot. Accordingly, the corresponding embodiments of the sixth embodiment of the present invention represent an application of bi-homodyne detection method in a non-confocal configuration for the measurement beam.

Interferometer 10 may comprise an interferometric apparatus such as described in U.S. Pat. No. 4,685,803 entitled "Method And Apparatus For The Measurement Of The Refractive Index Of A Gas" or U.S. Pat. No. 4,733,967 entitled "Apparatus Of The Measurement Of The Refractive Index Of A Gas" configured for homodyne detection methods. Both of the cited patents are by Gary E. Sommargren and the contents of both cited patents are herein incorporated in their entirety by way of reference. Embodiments of the present invention which comprise interferometric apparatus such as described in the two cited U.S. patents represents configurations of a non-confocal type.

Interferometer 10 may comprise a $\Gamma$ monitor such as described in U.S. Pat. No. 6,124,931 entitled "Apparatus And Methods For Measuring Intrinsic Optical Properties Of A Gas" by Henry A. Hill, the contents of which are here within incorporated in their entirety by way of reference. For embodiments of the present invention which comprise interferometric apparatus such as described in the cited U.S. patent, the described $\Gamma$ monitor is configured for the homodyne detection methods and the embodiments represent configurations that are of a non-confocal type.

Interferometer 10 may comprise a wavelength monitor such as described in U.S. Patent Provisional Application No. 60/337,459 entitled "A Method For Compensation For Effects Of Non-Isotropic Gas Mixtures In Single-Wavelength And Multiple-Wavelength Dispersion Interferometry" by Henry A. Hill, the contents of which are here within incorporated in their entirety by way of reference. For embodiments of the present invention which comprise interferometric apparatus such as described in the cited U.S. patent, the wavelength monitor is configured for the homodyne detection methods and the embodiments represent configurations that are of a non-confocal type.

Interferometer 10 may further comprise any type of interferometer, e.g. a differential plane mirror interferometer, a double-pass interferometer, a Michelson-type interferometer and/or a similar device such as is described in an article entitled "Differential Interferometer Arrangements For Distance And Angle Measurements: Principles, Advantages And Applications" by C. Zanoni, *VDI Berichte* Nr. 749, 93–106 (1989) configured for bi-homodyne detection. Interferometer 10 may also comprise a passive zero shear plane mirror interferometer as described in U.S. patent application Ser. No. 10/207,314 entitled "Passive Zero Shear Interferometers" or an interferometer with a dynamic beam steering element such as described in U.S. patent application Ser. No. 09/852,369 entitled "Apparatus And Method For Interferometric Measurements Of Angular Orientation And Distance To A Plane Mirror Object" and U.S. Pat. No. 6,271,923 entitled "Interferometry System Having A Dynamic Beam Steering Assembly For Measuring Angle And Distance," all of which are by Henry A. Hill. For embodiments of the present invention which comprise interferometric apparatus such as described in the cited U.S. patents and the article by Zanoni, the described interferometers are configured for the homodyne detection methods and the embodiments represent configurations that are of a non-confocal type. The contents of the article by Zanoni and the three cited patents by Hill are herein incorporated in their entirety by reference. The interferometer can be designed to monitor, for example, changes in optical path length, changes in physical path length, changes in wavelength of a beam, or changes in direction of propagation of a beam.

Interferometer 10 may further comprise a dispersion interferometer such as described in U.S. Pat. No. 6,219,144 B1 entitled "Apparatus and Method for Measuring the Refractive Index and Optical Path Length Effects of Air Using Multiple-Pass Interferometry" by Henry A. Hill, Peter de Groot, and Frank C. Demarest and U.S. Pat. No. 6,407, 816 entitled "Interferometer And Method For Measuring The Refractive Index And Optical Path Length Effects Of Air" by Peter de Groot, Henry A. Hill, and Frank C. Demarest. The contents of both of the cited patents are herein incorporated in their entirety by reference. For embodiments of the present invention which comprise interferometric apparatus such as described in the cited U.S. patents, the described interferometers are configured for the homodyne detection methods and the embodiments represent configurations that are of a non-confocal type.

Embodiments of the present invention may use the homodyne detection method using combinations of temporal, frequency, and polarization encoding as variants of the embodiments. For the embodiments of the present invention that are based on the apparatus shown in FIGS. 1*a*–1*d*, the corresponding variants of the embodiments that use the use variants of the apparatus shown in FIGS. 1*a*–1*c*. In the variants of the apparatus such as used in the first embodiment of the present invention, microscope 220 is modified to include a dispersive element such as a direct vision prism and/or a dichroic beam-splitter. When configured with a dichroic beam-splitter, a second detector is further added to the system. Descriptions of the variants of the apparatus are the same as corresponding portions of descriptions given for corresponding systems in cited U.S. Provisional Application No. 60/442,982 (ZI-45) and U.S. patent application Ser. No. 10/765,229 (ZI-45). Corresponding variants of apparatus are used for embodiments that comprise interferometers such as linear displacement interferometers.

The interferometric metrology systems described above can be especially useful in alignment mark identification on a stepper or scanner of lithography applications used for fabricating large scale integrated circuits such as computer chips and the like and in a stand-alone metrology system for measuring CD and overlay performance of the stepper or scanner. The interferometric metrology systems described above can also be especially useful in inspection of masks used in the stepper or scanner and in the inspection of wafers at different stages of the fabrication of large-scale integrated circuits.

Lithography is the key technology driver for the semiconductor manufacturing industry. In particular, overlay improvement is one of the five most difficult challenges down to and below 100 nm line widths (design rules), see, for example, the *Semiconductor Industry Roadmap*, pp 82 (1997). Since a lithography tool may produce $50–100M/ year of product, the economic value from improving (maintaining) performance of the lithography tool is substantial. Each 1% increase (loss) in yield of the lithography tool results in approximately $1 M/year economic benefit (loss) to the integrated circuit manufacturer and a substantial competitive advantage or disadvantage to the lithography tool vendor.

Overlay is measured by printing one pattern on one level of a wafer and a second pattern on a consecutive level of the wafer and then measuring, on a stand-alone metrology system, the difference in the position, orientation, and distortion of the two patterns.

A stand-alone metrology system for measuring overlay comprises a microscope system for viewing the patterns, such as the catadioptric imaging systems described above, connected to laser gauge-controlled stage for measuring the relative positions of the patterns, and a wafer handling system.

The function of a lithography tool is to direct spatially patterned radiation onto a photoresist-coated wafer. The process involves determining which location of the wafer is to receive the radiation (alignment) and applying the radiation to the photoresist at that location.

To properly position the wafer, the wafer includes alignment marks on the wafer that can be measured by dedicated sensors such as the interferometric metrology systems described above. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

When a mask is made, it must be perfect. Any defects in the pattern will destroy the functionality of the semiconductor circuit that is printed with that mask. Before a mask is delivered to the semiconductor manufacturing line, it is passed through an automated mask inspection system that searches for any defects in the pattern. There are two possible strategies in mask inspection, known as die-to-database and die-to-die inspection. The first method involves an automated scanning microscope or an interferometric metrology system described herein that compares the mask pattern directly with the computer data used to generate the mask. This requires a very large data handling capability, similar to that needed by the mask writer itself. Any discrepancy between the inspected mask pattern and the data set used to create it is flagged as an error. The interferometric metrology systems described above are especially well suited for automated mask inspection with its advantages in background reduction and in the substantially simultaneous acquisition of one-dimensional line section images and two-dimensional section images.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Figure 4A:
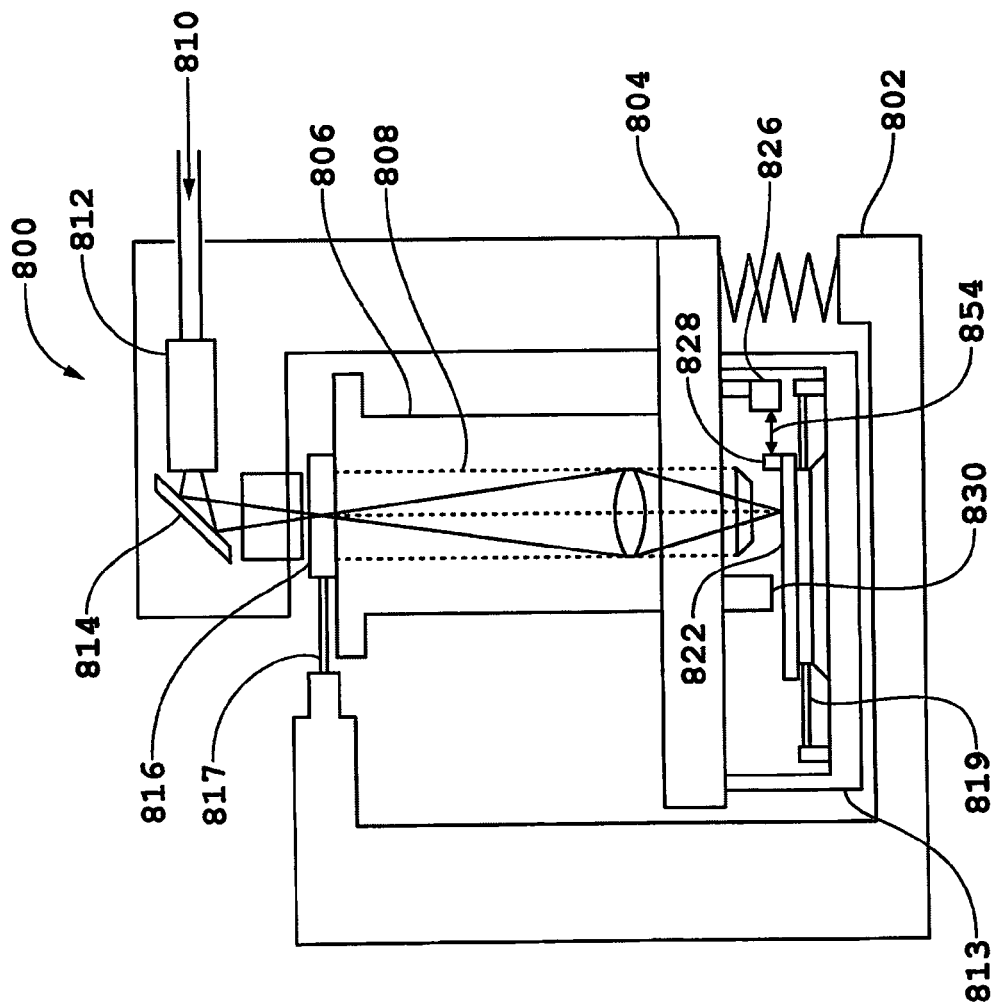
FIG. 4a is a schematic diagram of a lithography tool that uses an interferometric metrology system.

An example of a lithography scanner 800 using an interferometric metrology system 830 is shown in FIG. 4*a*. Interferometric metrology system 830 is used to precisely locate the position of alignment marks on the wafer (not shown) within an exposure system. Here, stage 822 is used to position and support the wafer relative to an exposure station. Scanner 800 includes a frame 802, which carries other support structures and various components carried on those structures. An exposure base 804 has mounted on top of it a lens housing 806 atop of which is mounted a reticle or mask stage 816, which is used to support a reticle or mask. A positioning system for positioning the mask relative to the exposure station is indicated schematically by element 817. Positioning system 817 can include, e.g. piezoelectric transducer elements and corresponding control electronics. Although, it is not included in this described embodiment, one or more interferometry systems are used to precisely measure the position of the mask stage as well as other moveable elements whose position must be accurately monitored in processes for fabricating lithographic structures (see supra Sheats and Smith *Microlithography: Science and Technology*).

Suspended below exposure base 804 is a support base 813 that carries wafer stage 822. Stage 822 includes a plane mirror 828 for reflecting a measurement beam 854 directed to the stage by interferometry system 826. A positioning system for positioning stage 822 relative to interferometry system 826 is indicated schematically by element 819. Positioning system 819 can include, e.g. piezoelectric transducer elements and corresponding control electronics. The measurement beam reflects back to the interferometry system, which is mounted on exposure base 804.

During operation, a radiation beam 810, e.g. an UV beam from a UV laser (not shown), passes through a beam shaping optics assembly 812 and travels downward after reflecting from mirror 814. Thereafter, the radiation beam passes through a mask (not shown) carried by mask stage 816. The mask (not shown) is imaged onto a wafer (not shown) on wafer stage 822 via a lens assembly 808 carried in a lens housing 806. Base 804 and the various components supported by it are isolated from environmental vibrations by a damping system depicted by spring 820.

Interferometric metrology system 830 such as described above is used to locate the position of alignment marks on the wafer and/or the wafer stage 816

Figure 4B:
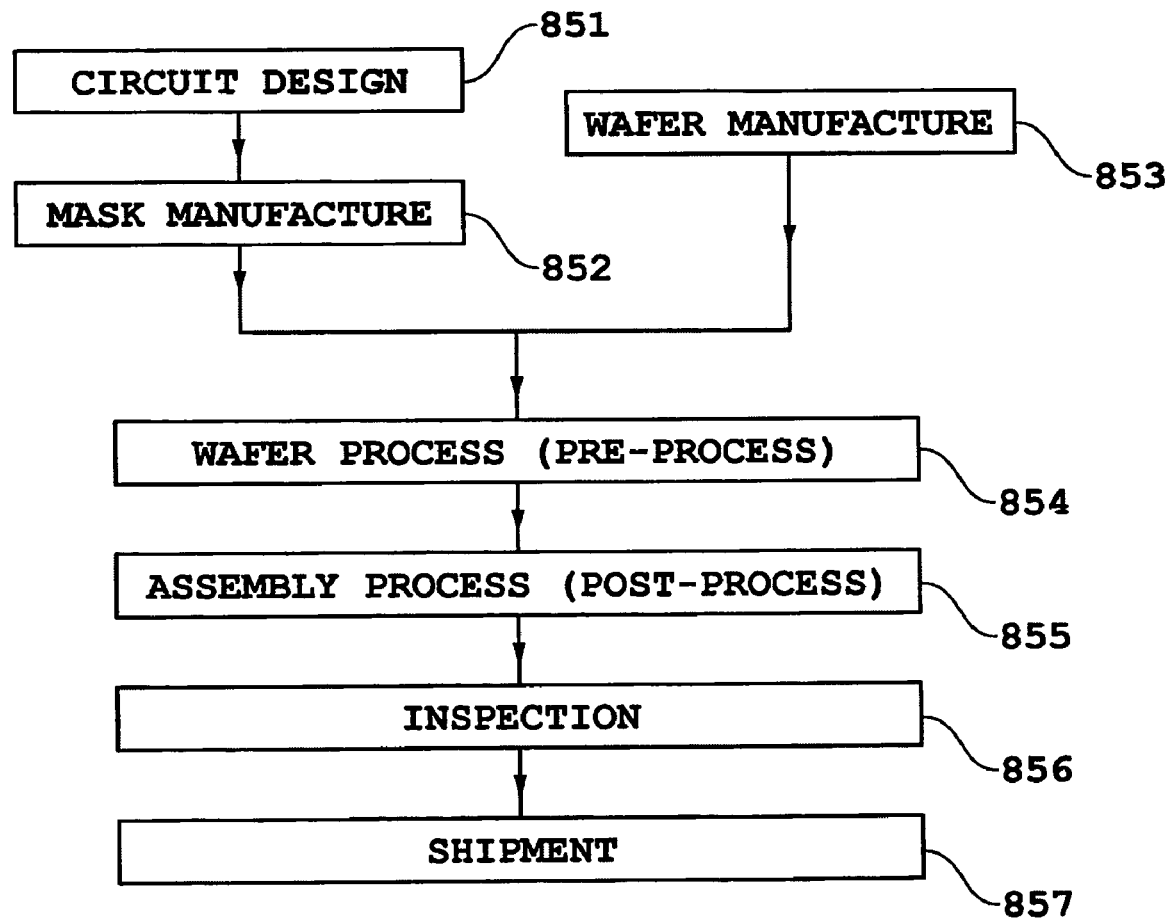
FIG. 4b is a flow chart of the sequence of manufacturing steps of a semiconductor device.

As is well known in the art, lithography is a critical part of manufacturing methods for making semiconductor devices. For example, U.S. Pat. No. 5,483,343 outlines steps for such manufacturing methods. These steps are described below with reference to FIGS. 4*b* and 4*c*. FIG. 4*b* is a flow chart of the sequence of manufacturing a semiconductor device such as a semiconductor chip (e.g. IC or LSI), a liquid crystal panel or a CCD. Step 851 is a design process for designing the circuit of a semiconductor device. Step 852 is a process for manufacturing a mask on the basis of the circuit pattern design. Step 853 is a process for manufacturing a wafer by using a material such as silicon.

Step 854 is a wafer process, which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The catadioptric imaging systems described herein can be especially useful to inspect the surface of the wafer and internal layers generate on the wafer by wafer processing to check and monitor the effectiveness of the lithography used in the wafer process. Step 855 is an assembling step, which is called a post-process wherein the wafer processed by step 854 is formed into semiconductor chips. This step includes assembling (dicing and bonding) and packaging (chip sealing). Step 856 is an inspection step wherein operability check, durability check and so on of the semiconductor devices produced by step 855 are carried out. With these processes, semiconductor devices are finished and they are shipped (step 857).

Figure 4C:
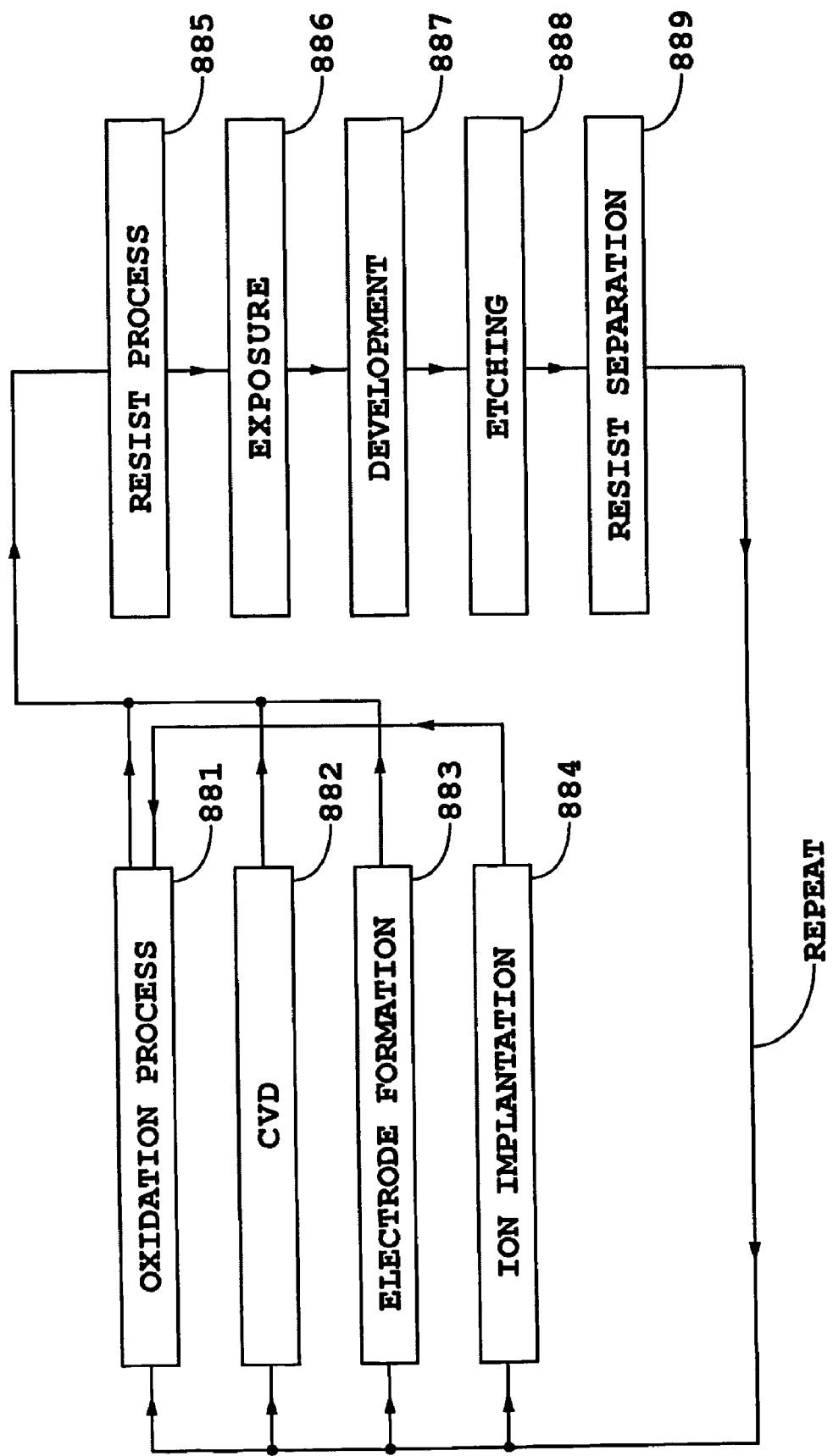
FIG. 4c is a flow chart showing steps of the wafer process.

FIG. 4*c* is a flow chart showing details of the wafer process. Step 861 is an oxidation process for oxidizing the surface of a wafer. Step 862 is a CVD process for forming an insulating film on the wafer surface. Step 863 is an electrode forming process for forming electrodes on the wafer by vapor deposition. Step 864 is an ion implanting process for implanting ions to the wafer. Step 865 is a resist process for applying a resist (photosensitive material) to the wafer. Step 866 is an exposure process for printing, by exposure (i.e. lithography), the circuit pattern of the mask on the wafer through the exposure apparatus described above. Once again, as described above, the use of the catadioptric imaging systems described herein improve the accuracy, resolution, and maintenance of such lithography steps.

Step 867 is a developing process for developing the exposed wafer. Step 868 is an etching process for removing portions other than the developed resist image. Step 869 is a resist separation process for separating the resist material remaining on the wafer after being subjected to the etching process. By repeating these processes, circuit patterns are formed and superimposed on the wafer.

Figure 5:
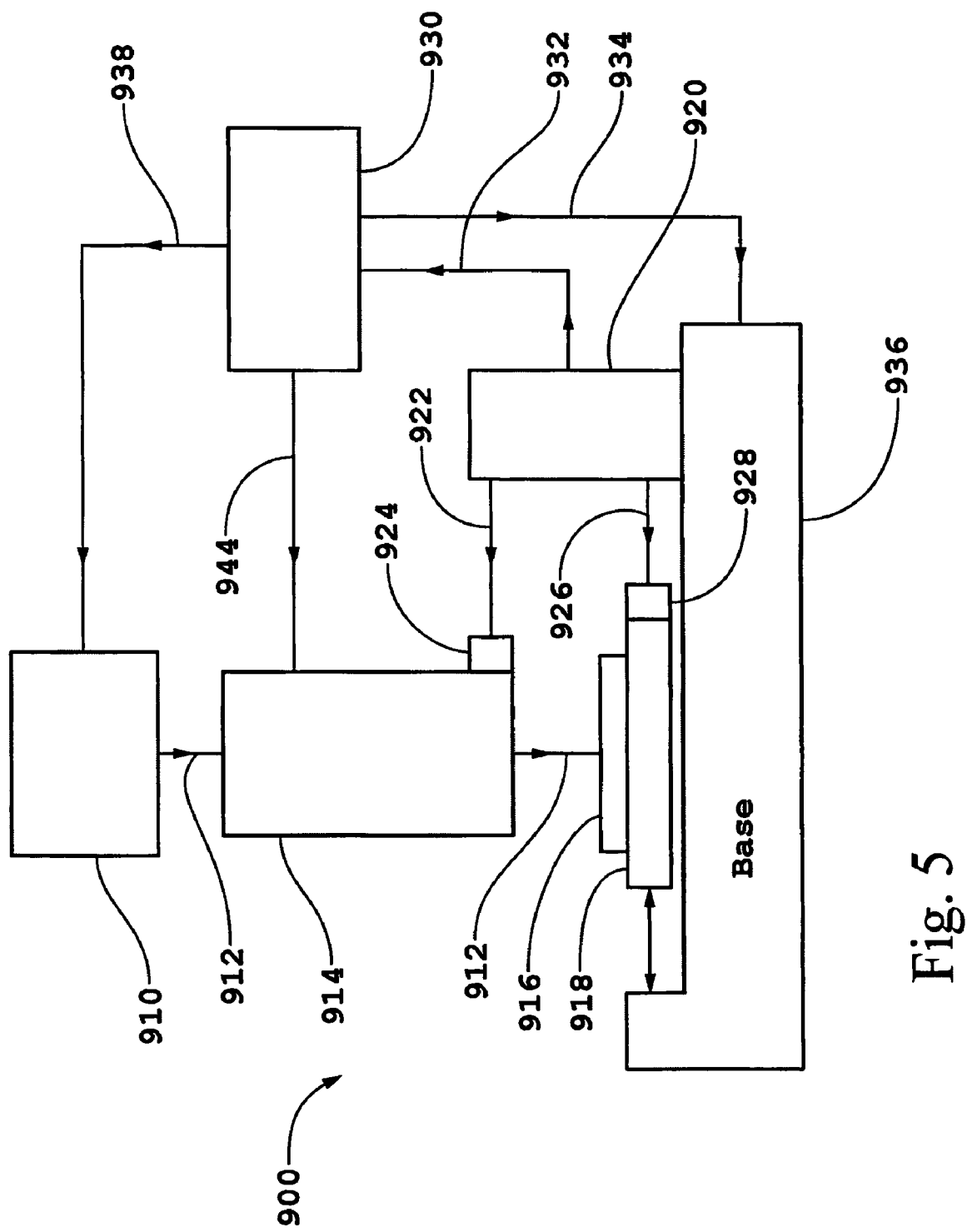
FIG. 5 is a schematic diagram of an inspection tool that uses an interferometric metrology system.

An important application of the interferometric metrology systems described herein is the inspection of patterns on masks and reticles used in the lithography methods described previously, the measurement of CD's and overlay on wafers and the inspection of the masks, reticles, and wafers for defects. As an example, a schematic of a mask and wafer inspection system 900 is shown in FIG. 5. A source 910 generates a source beam 912 and an interferometric metrology system 914 such as described herein directs the radiation beam to a substrate 916 supported by a movable stage 918. To determine the relative position of the stage, an interferometry system 920 directs a reference beam 922 to a mirror 924 mounted on beam focusing assembly 914 and a measurement beam 926 to a mirror 928 mounted on stage 918. Changes in the position measured by the interferometry system correspond to changes in the relative position of write beam 912 on substrate 916. Interferometry system 920 sends a measurement signal 932 to controller 930 that is indicative of the relative position of inspection beam 912 on substrate 916. Controller 930 sends an output signal 934 to a base 936 that supports and positions stage 918.

Controller 930 can cause interferometric metrology system assembly 914 to scan the inspection beam over a region of the substrate, e.g. using signal 944. As a result, controller 930 directs the other components of the system to inspect the substrate. The mask and wafer inspection measures overlay and compares the mask, reticle, or wafer pattern obtained with interferometric metrology system 914 directly with computer data used to generate the mask, reticle or the pattern on the wafer.

Other embodiments are within the following claims.

What is claimed is:

1. A method of interferometrically obtaining measurements for properties associated with a spot on or in an object, said method comprising:
   receiving a sequence of M optical pulses separated in time, wherein M is an integer;
   from each pulse in the sequence of M optical pulses, generating an n-tuplet of measurement pulses spaced apart in time, and an n-tuplet of reference pulses that are spaced apart in time, wherein n is an integer, wherein each measurement pulse has a corresponding reference pulse aligned with it in time;
   from each pulse of each n-tuplet of reference pulses for the sequence of M optical pulses, generating a reference beam;
   from each pulse of each n-tuplet of measurement pulses for the sequence of M optical pulses,
   (a) generating a measurement beam;
   (b) directing the measurement beam onto said spot to thereby produce a return measurement beam from said spot; and
   (c) combining the return measurement beam with the corresponding reference beam that was derived from the reference pulse corresponding to that measurement pulse to generate an interference beam;
   wherein the sequence of M n-tuplets of measurement pulses forms n interleaved sequences of M measurement pulses, and wherein said method further comprises, for each of the n interleaved sequences of M measurement pulses, introducing a combination of phase shifts between the measurement beams and corresponding reference beams.

2. The method of claim 1, wherein the spacing between the pulses of each n-tuplet is less than the spacing between the pulses of the M pulse sequence.

3. The method of claim 1, wherein the pulses of the sequence of M optical pulses have a spacing in time of $T_r$.

4. The method of claim 3, wherein generating from each pulse in the sequence of M optical pulses the n-tuplet of measurement pulses spaced apart in time involves generating the n-tuplet of measurement pulses to have a spacing in time of $t_T$.

5. The method of claim 4, wherein the pulses of the n-tuplet have a half-width of $t_p$ and wherein $t_T > t_p$.

6. The method of claim 1, wherein $T_r \gg t_T$.

7. The method of claim 1, wherein the combination of phase shifts is selected so that each of said n interleaved sequences of M measurement pulses maps to a different component of one or more conjugated quadratures of fields of one or more beams coming from said spot on or in the object.

8. The method of claim 1, wherein n equals 2.

9. The method of claim 8, wherein M is equal to four.

10. The method of claim 8, wherein the two interleaved sequences of M measurement pulses includes a first sequence and a second sequence, and wherein said combinations of phase shifts are selected so that said first sequence of measurement pulses maps to a first component of conjugated quadratures of fields of beams coming from said spot and said second sequence of measurement pulses maps to a second component of the conjugated quadratures of the fields of the beams coming from said spot.

11. The method of claim 1, wherein the combinations of phase shifts are selected so that each of said n interleaved sequences of M measurement pulses maps to a different component of one or more conjugated quadratures of fields of beams coming from said spot on or in the object.

12. The method of claim 1, further comprising, for each n-tuplet of the M n-tuplets of measurement pulses, producing a single electrical interference signal value from the corresponding n interference beams for that n-tuplet of measurement pulses to thereby produce M electrical interference signal values for the sequence of M optical pulses.

13. The method of claim 1, further comprising generating the sequence of M optical pulses.

14. The method of claim 8, wherein each sequence of the two interleaved sequences of M measurement pulses has a corresponding average time for the pulses of that sequence and wherein the average times for the two interleaved sequences are identical.

15. The method of claim 8, wherein each sequence of the two interleaved sequences of M optical pulses has a corresponding average time for the pulses of that sequence and wherein the average times for the two interleaved sequences are different.

16. A method of interferometrically obtaining measurements for properties associated with a spot on or in an object, said method comprising:
   receiving a sequence of M optical pulses separated in time, wherein M is an integer;
   from each pulse in the sequence of M optical pulses, generating an n-tuplet of measurement pulses spaced apart in time, and an n-tuplet of reference pulses that are spaced apart in time, wherein n is an integer, wherein each measurement pulse has a corresponding reference pulse aligned with it in time;
   from each pulse of each n-tuplet of reference pulses for the sequence of M optical pulses, generating a reference beam;
   from each pulse of each n-tuplet of measurement pulses for the sequence of M optical pulses,
   (a) generating a measurement beam;
   (b) directing the measurement beam onto said spot to thereby produce a return measurement beam from said spot; and
   (c) combining the return measurement beam with the corresponding reference beam that was derived from the reference pulse corresponding to that measurement pulse to generate an interference beam;

for each n-tuplet of measurement pulses of the sequence of M n-tuplets of measurement pulses, producing a single electrical interference signal value from the corresponding n interference beams for that n-tuplet of measurement pulses to thereby produce M electrical interference signal values for the sequence of M optical pulses.

17. The method of claim 16, wherein the spacing between the pulses of each n-tuplet is less than the spacing between the pulses of the M pulse sequence.

18. The method of claim 16, wherein the pulses of the sequence of M optical pulses have a spacing in time of $T_r$.

19. The method of claim 18, wherein generating from each pulse in the sequence of M optical pulses the n-tuplet of measurement pulses spaced apart in time involves generating the n-tuplet of measurement pulses to have a spacing in time of $t_T$.

20. The method of claim 19, wherein the pulses of the n-tuplet have a half-width of $t_p$ and wherein $t_T > t_p$.

21. The method of claim 19, wherein $T_r >> t_T$.

22. The method of claim 16, wherein n equals 2.

23. The method of claim 22, wherein M is equal to four.

24. An interferometric system for obtaining measurements for properties associated with a spot on or in an object, said system comprising:
   a source which during operation generates a sequence of M optical pulses separated in time, wherein M is an integer;
   a beam conditioner which during operation generates from each pulse in the sequence of M optical pulses, an n-tuplet of measurement pulses spaced apart in time, and an n-tuplet of reference pulses that are spaced apart in time, wherein n is an integer, wherein each measurement pulse has a corresponding reference pulse aligned with it in time;
   an interferometer which is configured to generate from each pulse of each n-tuplet of reference pulses for the sequence of M optical pulses, a reference beam, and to generate from each pulse of each n-tuplet of measurement pulses for the sequence of M optical pulses, a measurement beam, wherein said interferometer is further configured to direct the measurement beam onto said spot to thereby produce a return measurement beam from said spot; and to combine the return measurement beam with the corresponding reference beam that was derived from the reference pulse corresponding to that measurement pulse to generate an interference beam;
   a detector system which converts the interference beams to electrical interference signals; and
   a controller which is configured to produce for each n-tuplet of measurement pulses of the sequence of M n-tuplets of measurement pulses a single electrical interference signal value from the corresponding n interference beams for that n-tuplet of measurement pulses to thereby produce M electrical interference signal values for the sequence of M optical pulses.

25. An interferometric system for obtaining measurements for properties associated with a spot on or in an object, said system comprising:
   a source which during operation generates a sequence of M optical pulses separated in time, wherein M is an integer;
   a beam conditioner which during operation generates from each pulse in the sequence of M optical pulses, an n-tuplet of measurement pulses spaced apart in time, and an n-tuplet of reference pulses that are spaced apart in time, wherein n is an integer, wherein each measurement pulse has a corresponding reference pulse aligned with it in time and wherein the sequence of M n-tuplets of measurement pulses forms n interleaved sequences of M measurement pulses;
   an interferometer which is configured to generate from each pulse of each n-tuplet of reference pulses for the sequence of M optical pulses, a reference beam, and to generate from each pulse of each n-tuplet of measurement pulses for the sequence of M optical pulses, a measurement beam, wherein said interferometer is further configured to direct the measurement beam onto said spot to thereby produce a return measurement beam from said spot; and to combine the return measurement beam with the corresponding reference beam that was derived from the reference pulse corresponding to that measurement pulse to generate an interference beam;
   a detector system which converts the interference beams to electrical interference signals; and
   a controller which is configured to introduce, for each of the n interleaved sequences of M measurement pulses, a combination of phase shifts between the measurement beams and corresponding reference beams.

* * * * *